US009335504B2

(12) United States Patent
Solheid et al.

(10) Patent No.: US 9,335,504 B2
(45) Date of Patent: May 10, 2016

(54) FIBER DISTRIBUTION HUB WITH SWING FRAME AND WRAP-AROUND DOORS

(71) Applicant: ADC Telecommunications, Inc., Berwyn, PA (US)

(72) Inventors: James J. Solheid, Lakeville, MN (US); Matthew Holmberg, Le Center, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/072,254

(22) Filed: Nov. 5, 2013

(65) Prior Publication Data

US 2014/0248027 A1 Sep. 4, 2014

Related U.S. Application Data

(63) Continuation of application No. 12/839,852, filed on Jul. 20, 2010, now Pat. No. 8,577,198, which is a continuation of application No. 11/743,941, filed on May 3, 2007, now Pat. No. 7,760,984.

(60) Provisional application No. 60/797,890, filed on May 4, 2006.

(51) Int. Cl.
 *G02B 6/44* (2006.01)
(52) U.S. Cl.
 CPC .................................... *G02B 6/4452* (2013.01)
(58) Field of Classification Search
 USPC .......................................................... 385/135
 See application file for complete search history.

(56) References Cited

U.S. PATENT DOCUMENTS

| 4,003,610 A | 1/1977 | Main |
| 4,736,100 A | 4/1988 | Vastagh |
| 4,747,020 A | 5/1988 | Brickley et al. |
| 4,792,203 A | 12/1988 | Nelson et al. |
| 4,824,196 A | 4/1989 | Bylander |
| 4,861,134 A | 8/1989 | Alameel et al. |
| 4,900,123 A | 2/1990 | Barlow et al. |
| 4,948,220 A | 8/1990 | Violo et al. |

(Continued)

FOREIGN PATENT DOCUMENTS

| CN | 2426610 Y | 4/2001 |
| EP | 0 743 701 A2 | 11/1996 |

(Continued)

OTHER PUBLICATIONS

ADC Telecommunications, Inc., brochure titled *Value-Added module System*, © 2000 (29 pages).

(Continued)

*Primary Examiner* — John M Bedtelyon
(74) *Attorney, Agent, or Firm* — Merchant & Gould P.C.

(57) ABSTRACT

A fiber distribution hub (FDH) provides an interface between an incoming fiber and a plurality of outgoing fibers. The FDH includes a cabinet, at least one door pivotably mounted to the cabinet, and a frame pivotably mounted within the cabinet. The doors wrap around the sides and the front of the cabinet to provide access to both the front and sides of the frame when the doors are open. The frame can pivot out of the cabinet through the open doors to enable access to the rear of the cabinet and the rear side of the frame. The frame includes a termination region and a splitter region. The frame can include a storage region and/or a pass-through region.

12 Claims, 20 Drawing Sheets

(56) References Cited

U.S. PATENT DOCUMENTS

| | | |
|---|---|---|
| 4,995,688 A | 2/1991 | Anton et al. |
| 5,023,646 A | 6/1991 | Ishida et al. |
| 5,058,983 A | 10/1991 | Corke et al. |
| 5,073,042 A | 12/1991 | Mulholland et al. |
| 5,076,688 A | 12/1991 | Bowen et al. |
| 5,109,467 A | 4/1992 | Hogan et al. |
| 5,142,598 A | 8/1992 | Tabone |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| D362,255 S | 9/1995 | White |
| 5,448,015 A | 9/1995 | Jamet et al. |
| 5,469,526 A | 11/1995 | Rawlings |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,636,138 A | 6/1997 | Gilbert et al. |
| 5,647,043 A | 7/1997 | Anderson et al. |
| 5,708,751 A | 1/1998 | Mattei |
| 5,734,776 A | 3/1998 | Puetz |
| 5,764,844 A | 6/1998 | Mendes |
| 5,774,612 A | 6/1998 | Belenkiy et al. |
| 5,823,646 A | 10/1998 | Arizpe et al. |
| 5,825,955 A | 10/1998 | Ernst et al. |
| 5,828,807 A | 10/1998 | Tucker et al. |
| 5,883,995 A | 3/1999 | Lu |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 5,982,972 A | 11/1999 | Tucker et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,076,975 A | 6/2000 | Roth |
| 6,079,881 A | 6/2000 | Roth |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,247,849 B1 | 6/2001 | Liu |
| 6,256,443 B1 | 7/2001 | Uruno |
| 6,271,484 B1 | 8/2001 | Tokutsu |
| 6,278,829 B1 | 8/2001 | BuAbbud et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,483,977 B2 | 11/2002 | Battey et al. |
| 6,496,640 B1 | 12/2002 | Harvey et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,577,595 B1 | 6/2003 | Counterman |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,721,484 B1 | 4/2004 | Blankenship et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,778,752 B2 | 8/2004 | Laporte et al. |
| 6,788,535 B2 * | 9/2004 | Dodgen et al. ................ 361/695 |
| 6,788,786 B1 | 9/2004 | Kessler et al. |
| 6,792,190 B2 | 9/2004 | Xin et al. |
| 6,792,191 B1 | 9/2004 | Clapp, Jr. et al. |
| 6,815,612 B2 | 11/2004 | Bloodworth et al. |
| 6,845,207 B2 | 1/2005 | Schray |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,901,200 B2 | 5/2005 | Schray |
| 6,909,833 B2 | 6/2005 | Henschel et al. |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 | 12/2005 | Swieconek |
| 6,983,095 B2 | 1/2006 | Reagan et al. |
| 7,029,322 B2 | 4/2006 | Ernst et al. |
| 7,086,539 B2 | 8/2006 | Knudsen et al. |
| 7,088,899 B2 | 8/2006 | Reagan et al. |
| 7,103,255 B2 | 9/2006 | Reagan et al. |
| 7,142,764 B2 | 11/2006 | Allen et al. |
| 7,146,089 B2 | 12/2006 | Reagan et al. |
| 7,171,102 B2 | 1/2007 | Reagan et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,277,620 B2 | 10/2007 | Vongseng et al. |
| 7,298,952 B2 | 11/2007 | Allen et al. |
| 7,352,945 B2 | 4/2008 | Holmberg et al. |
| 7,369,741 B2 * | 5/2008 | Reagan et al. ................ 385/139 |
| 7,397,997 B2 | 7/2008 | Ferris et al. |
| 7,400,815 B2 | 7/2008 | Mertesdorf et al. |
| 7,407,330 B2 | 8/2008 | Smith et al. |
| 7,428,365 B1 | 9/2008 | Brinson et al. |
| 7,457,503 B2 | 11/2008 | Solheid et al. |
| 7,471,869 B2 | 12/2008 | Reagan et al. |
| 7,474,828 B2 | 1/2009 | Leon et al. |
| 7,526,172 B2 | 4/2009 | Gniadek et al. |
| 7,646,958 B1 | 1/2010 | Reagan et al. |
| 7,760,984 B2 | 7/2010 | Solheid et al. |
| 7,809,232 B2 | 10/2010 | Reagan et al. |
| 7,809,235 B2 | 10/2010 | Reagan et al. |
| 8,577,198 B2 | 11/2013 | Solheid et al. |
| 2002/0034290 A1 | 3/2002 | Pershan |
| 2002/0130598 A1 | 9/2002 | Schmidt |
| 2002/0150372 A1 | 10/2002 | Schray |
| 2002/0181893 A1 | 12/2002 | White et al. |
| 2003/0165315 A1 | 9/2003 | Trebesch et al. |
| 2003/0174996 A1 | 9/2003 | Henschel et al. |
| 2003/0207601 A1 | 11/2003 | Adachi |
| 2004/0074852 A1 | 4/2004 | Knudsen et al. |

(56) References Cited

U.S. PATENT DOCUMENTS

| | | |
|---|---|---|
| 2004/0126069 A1 | 7/2004 | Jong et al. |
| 2004/0165852 A1 | 8/2004 | Erwin et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0129379 A1 | 6/2005 | Reagan et al. |
| 2005/0163448 A1 | 7/2005 | Blackwell et al. |
| 2006/0008231 A1 | 1/2006 | Reagan et al. |
| 2006/0083475 A1 | 4/2006 | Grubish et al. |
| 2006/0115220 A1 | 6/2006 | Elkins et al. |
| 2006/0204200 A1 | 9/2006 | Lampert et al. |
| 2007/0047894 A1 | 3/2007 | Holmberg et al. |
| 2007/0165995 A1 | 7/2007 | Reagan et al. |
| 2007/0189691 A1 | 8/2007 | Barth et al. |
| 2008/0008436 A1 | 1/2008 | Reagan et al. |
| 2008/0008437 A1 | 1/2008 | Reagan et al. |
| 2008/0013910 A1 | 1/2008 | Reagan et al. |
| 2008/0019644 A1 | 1/2008 | Smith et al. |
| 2008/0019655 A1 | 1/2008 | Vongseng et al. |
| 2008/0025684 A1 | 1/2008 | Vongseng et al. |
| 2008/0042535 A1 | 2/2008 | Guzzo et al. |
| 2008/0042536 A1 | 2/2008 | Guzzo et al. |
| 2009/0074372 A1 | 3/2009 | Solheid et al. |
| 2009/0087157 A1 | 4/2009 | Smith et al. |
| 2009/0297111 A1 | 12/2009 | Reagan et al. |
| 2009/0317045 A1 | 12/2009 | Reagan et al. |
| 2010/0124392 A1 | 5/2010 | Reagan et al. |
| 2010/0226615 A1 | 9/2010 | Reagan et al. |

FOREIGN PATENT DOCUMENTS

| | | |
|---|---|---|
| EP | 0 788 002 | 8/1997 |
| EP | 0 871 047 | 10/1998 |
| EP | 0 975 180 | 1/2000 |
| EP | 1 045 267 | 10/2000 |
| JP | 63-229409 | 9/1988 |
| JP | 1144266 S | 6/2002 |
| JP | 3307618 B2 | 7/2002 |
| JP | 3761762 B2 | 3/2006 |
| WO | WO 95/20175 | 7/1995 |
| WO | WO 98/53347 | 11/1998 |
| WO | WO 99/27404 | 6/1999 |
| WO | WO 00/52504 | 9/2000 |
| WO | WO 00/75706 | 12/2000 |
| WO | WO 02/21182 | 3/2002 |
| WO | WO 02/103429 | 12/2002 |

OTHER PUBLICATIONS

ADC Telecommunications, Inc., brochure titled *Value-Added module System: Optical Distribution Frame (OMX™ 600)*, © 2001 (11 pages).
Assembly reference drawings having drawing No. 1067101, dated Aug. 17, 1999 (8 pages).
Connectorized splitter drawings having drawing No. 1067961, dated Aug. 18, 1999 (2 pages).
European Search Report mailed Apr. 2, 2008 for a European application having Publication No. EP 1914578.
Fiber distribution drawings having drawing No. 1069967, dated Aug. 17, 1999 (2 pages).
Installation drawings having drawing No. 1069965, dated Aug. 14, 1999 (3 pages).
Nexans, Cross-Connect Cabinet III: Plastic Watertight Cabinet for FTTH Applications, dated 2002 (2 pages).
Nexans, Cross-Connect Cabinet V: Metallic Watertight Cabinet for FTTH Applications, dated 2002 (2 pages).
Portions of the prosecution history of copending and commonly assigned patent application having U.S. Publication No. 2007/0165995 including Restriction Requirement mailed Nov. 1, 2007, Response to Restriction Requirement submitted Dec. 3, 2007, Non-final Office Action mailed Jan. 2, 2008, Response to Non-final Office Action submitted May 2, 2008, Notice of Allowance mailed Jun. 26, 2008, Amendment After Allowance and Issue fee payment submitted Sep. 25, 2008, Response to Amendment After Allowance mailed Oct. 10, 2008, an Issue Notification mailed Oct. 29, 2008, Petition to Withdraw from Issue, RCE, and Amendment mailed Nov. 14, 2008, Patent Withdrawal Notice mailed Nov. 17, 2008, Non-final Office Action mailed Dec. 11, 2008, and Response to Non-final Office Action submitted Mar. 27, 2009 (88 pages total).
Brochure from Amphenol Corp. entitled "Amphenol® 954 Series one piece SC Connector," 2 pgs. (1990).
AMP Inc. catalog entitled "Fiber Optic Products," front and back covers and p. 59, (4 pgs.) (© 1991).
HRS catalog entitled "Optical Fibre Connectors," front and back covers and pp. 16, 17 and 49 (5 pages) (Mar. 1991).
AT&T Network Systems catalog entitled "Fiber Optic Products Innovation for wide ranging applications," front and back covers and pp. 6-1 through 6-16 (18 pages) (© 1995).
NTT Int'l Fiber Termination Module (FTM) & Premises Optical Distribution Cabinets (PODC) product brochure, 3 pages, undated.
ADC Telecommunications, Inc.'s Outside Plant, Fiber Cross-Connect Solutions Products Brochure; front cover, Table of Contents, pp. 1-48, and back cover.; revised Jun. 2002, Item No. 1047.
ADC Telecommunications, Inc.'s 6th Edition of Next Generation Frame (NGF) Product Family Ordering Guide; front cover, Table of Contents, pp. 1-41, and back cover; revised Feb. 2003, Item No. 820.
ADC Telecommunications, Inc.'s Fiber Optic, Cable Assemblies and Accessories Brochure; front cover, Table of Contents, pp. 1-23, and back cover; revised Apr. 2003, Item No. 100300.
ADC Telecommunications, Inc.'s OMX™ 600, Optical Distribution Frame Brochure; front cover, Table of Contents, pp. 1-14, and back cover; revised Feb. 2000, Item No. 854.
Iwano, S. et al., "MU-type Optical Fiber Connector System," *NTT Review*, vol. 9, No. 2, pp. 63-71 (Mar. 1997).
Sugita, E. et al., "SC-Type Single-Mode Optical Fiber Connectors," *Journal of Lightwave Technology*, vol. 7, No. 11, pp. 1689-1696 (Nov. 1989).
FONS Corporation's MDC Series Rack or Wall Mount Enclosures product sheet, 3 pages, (2002).
FONS Corporation's Modular Distribution Cabinets Rack Mount Enclosures, Model MDC-7, product sheet, 2 pages (2005) (shows the same device as shown in Exhibit L).
FONS Corporation's Technical Drawing No. 11669, Rev. D, of Distribution Cabinet Assembly MFDC-7, 1 page (technical drawing depicting the device shown in Exhibit M).
ADC Telecommunications, Inc.'s Secure Fiber Entrance Terminal (SFET) Brochure; front cover, pp. 2-7, and back cover; revised May 1998, Item No. 1005.
ADC Telecommunications, Inc.'s 2nd Edition of Fiber Panel Products; front cover, Table of Contents, pp. 1-111, and back cover; revised Jul. 1996, Item No. 846.
24-Fiber Wall-Mount Box FPL Duplex Adapters, ADC Telecommunications; Fiber Panel Products—Specialty Panels, Jul. 1996, p. 65.
FL1000—Customer Premises Fiber Distribution Products, ADC Telecommunications; © 1998, pp. 1-8.
FONS Small Termination Interconnect Cabinet; FONS® Fiber Optic Network Solutions, now part of ADC Telecommunications, Inc., FONS Corp. © 2005, 2 pages.
FONS LX-10 Series Cabinets, Wall Mount Enclosures, FONS® Fiber Optic Network Solutions, now part of ADC Telecommunications, Inc., FONS Corp. © 2005, pp. 1-3.
FONS Wall Mount Patch/Splice Enclosure, Indoor Wall Mount Terminals, FONS® Fiber Optic Network Solutions, now part of ADC Telecommunications, Inc., FONS Corp. © 2005, 1 page.
FONS TIC Series Cabinets, Indoor Wall Mount Terminals, FONS® Fiber Optic Network Solutions, now part of ADC Telecommunications, Inc., FONS Corp. © 2005, pp. 1-3.
24 photos of LambdaUnite® Blank Card; "LambdaUnite® MultiService Switch (MSS)" brochure (2003); and "Lucent's LambdaUnite® Busts Out" official release (Jan. 29, 2002).
Certified English translation of PCT publication WO 99/27404, which was published Jun. 3, 1999.

(56) References Cited

OTHER PUBLICATIONS

Tachikura et al., Newly Developed Optical Fiber Distribution System and Cable Management in Central Office, International Wire & Cable Symposium, Proceedings of the 50th IWCS (which took place in 2001), pp. 98-105.

Optical fiber coupler review, Technical Report 2001, showing Sumitomo Osaka Cement Co. Ltd's Optical Coupler (pp. 41-42).

ATI Optique Catalog, ATI Optique Division of TI electronique, Version 2.6, released Mar. 27, 2002 (50 pages).

Hasegawa et al., *100GHz-48CH Athermal AWG with a Novel Temperature Insensitive Principle*, National Fiber Optics Engineers Conference, 2003 Technical Proceedings, pp. 801-808.

*Couplers: Couplers WDMS Packaging*, Alcoa Fujikura Ltd., Telecommunications Division, © 2000 (5 pages) showing AFL splitters.

21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.

\* cited by examiner

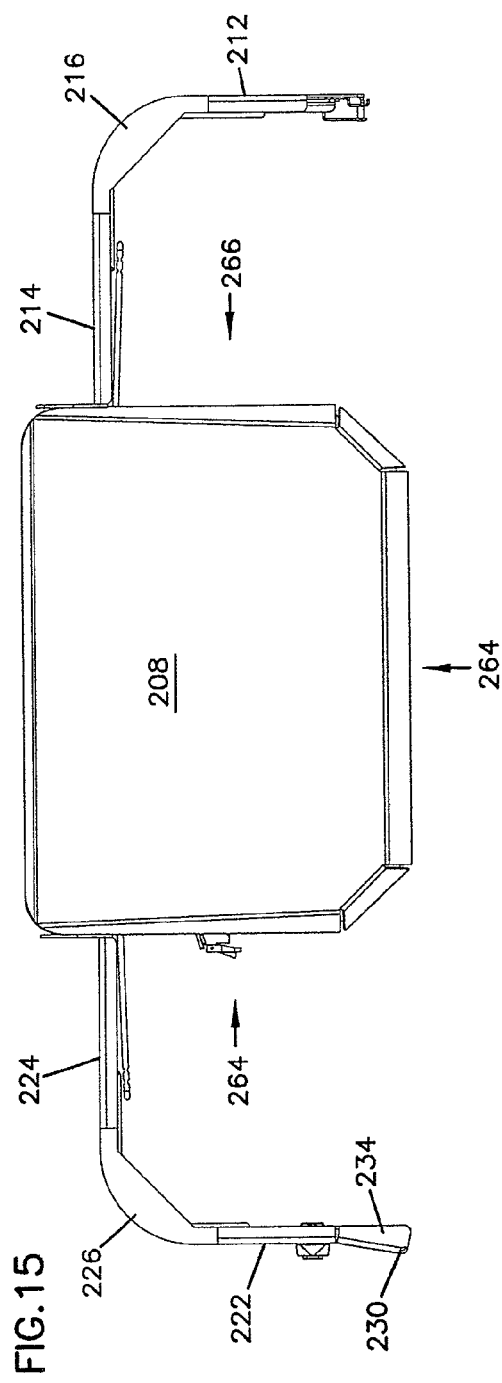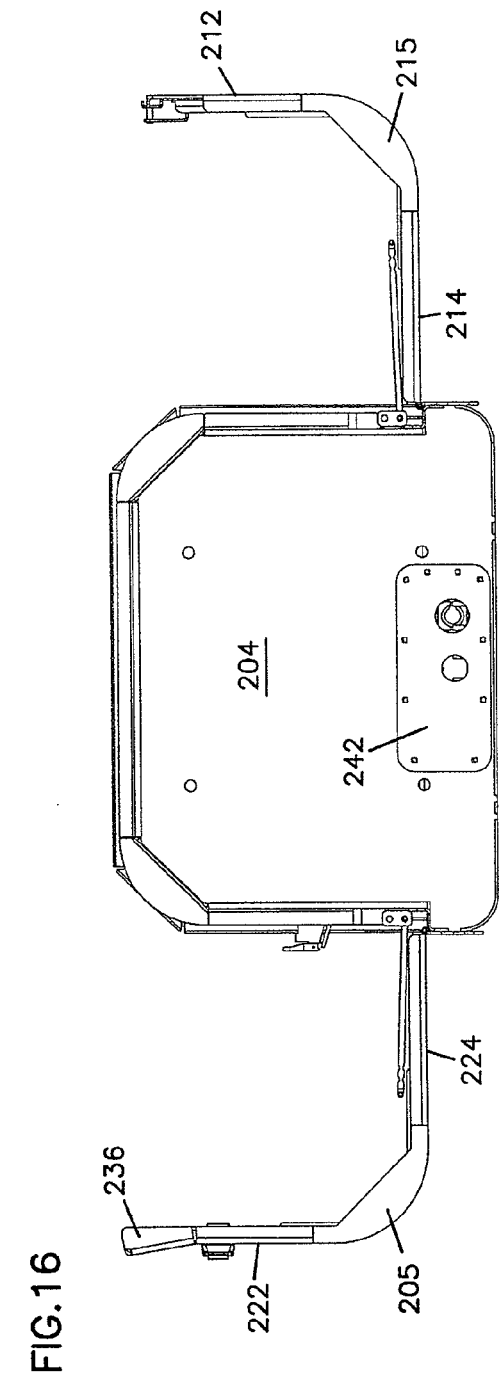

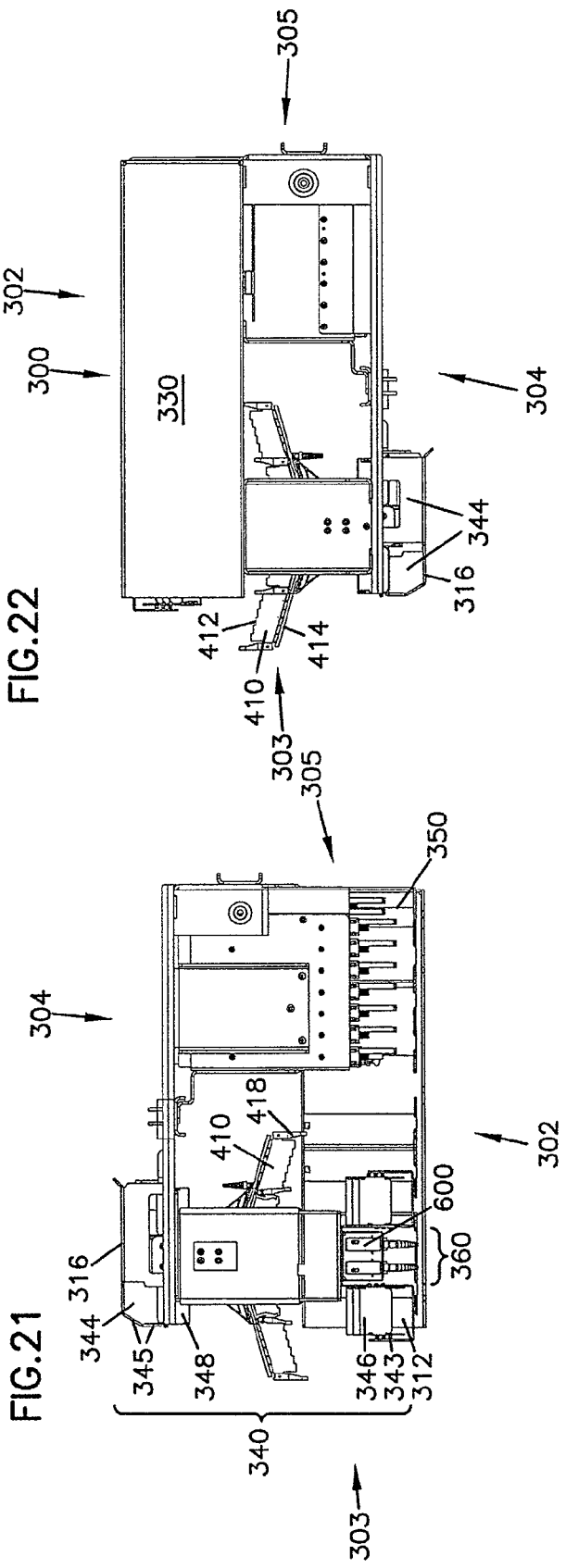

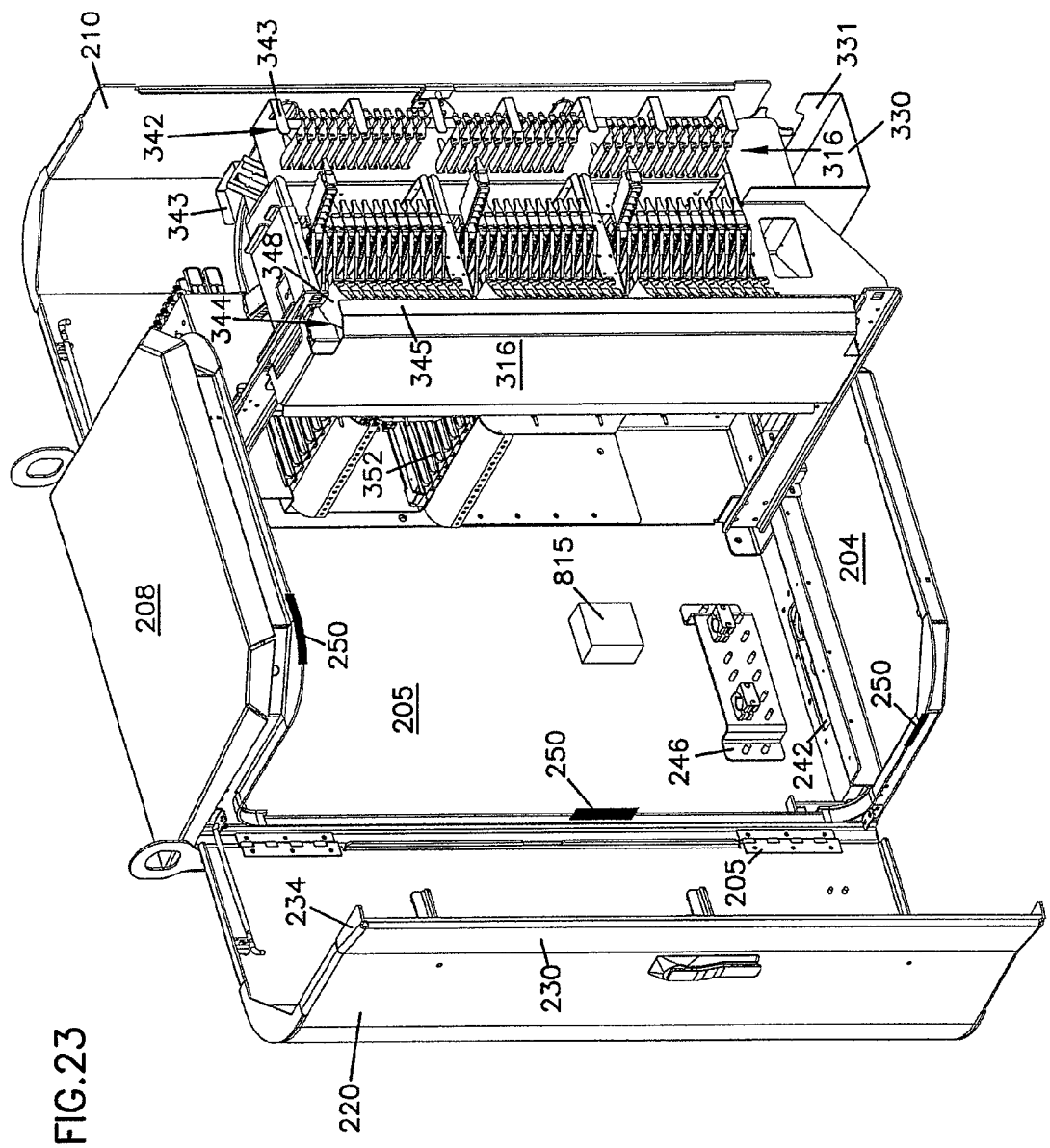

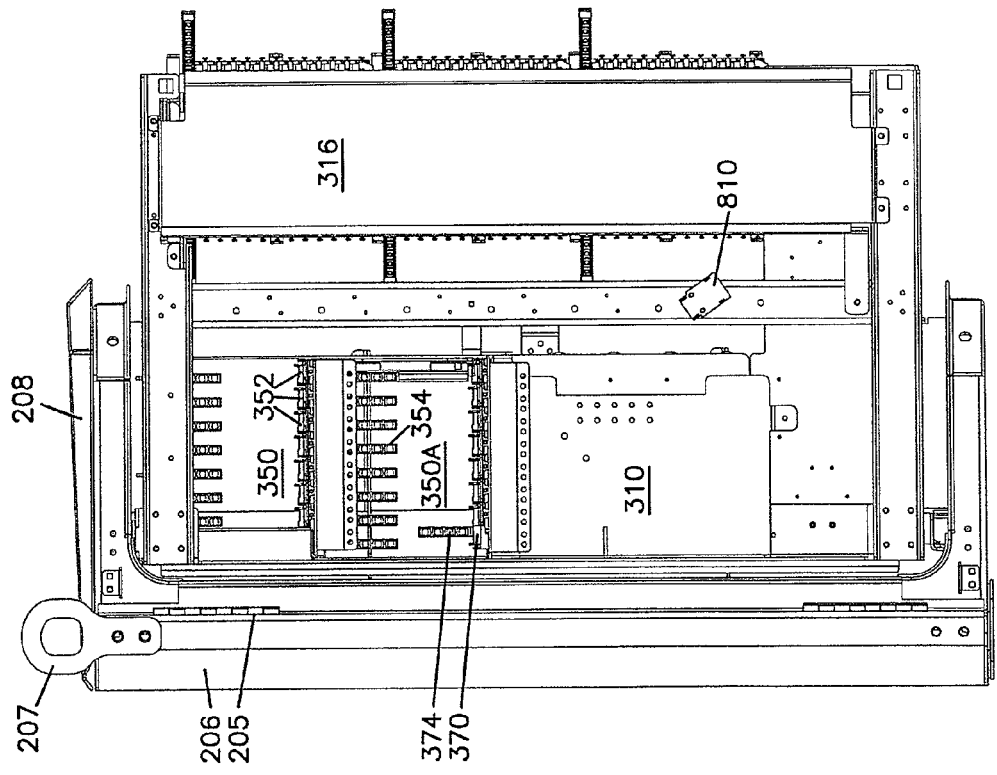
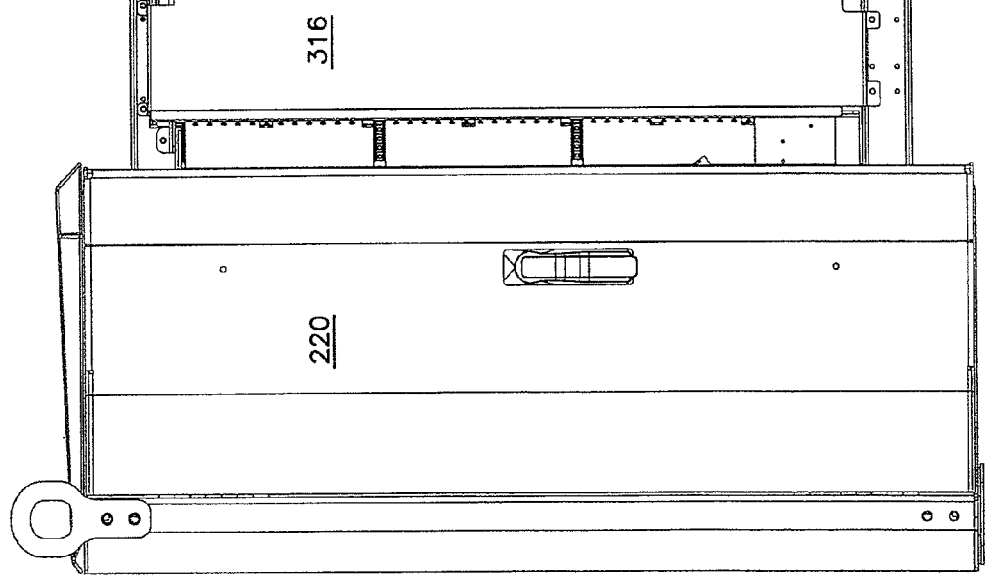

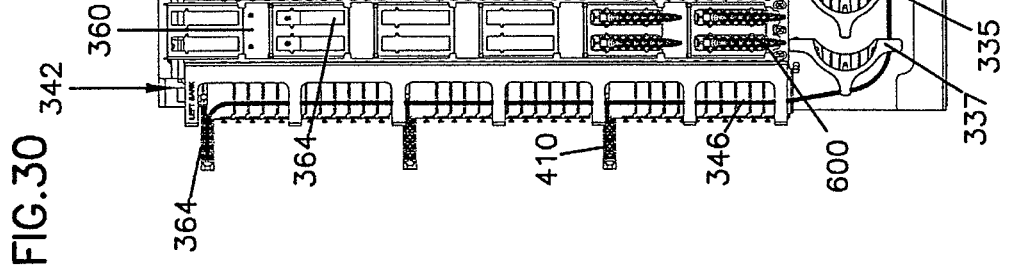
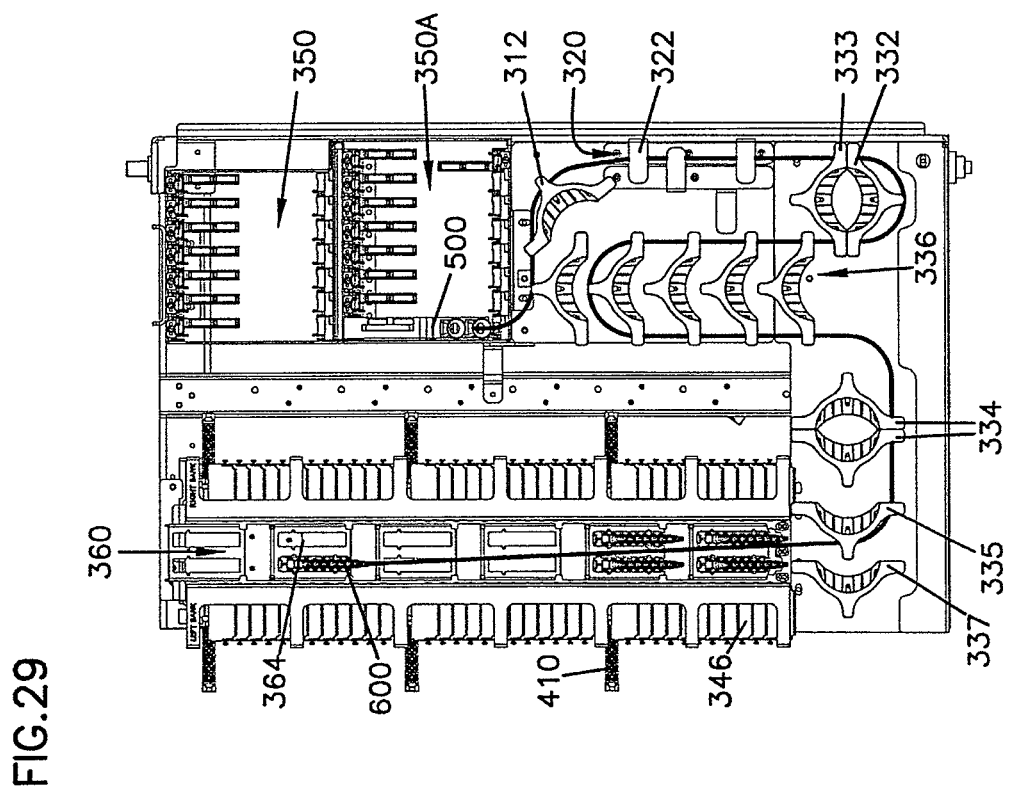
FIG.29
FIG.30

FIBER DISTRIBUTION HUB WITH SWING FRAME AND WRAP-AROUND DOORS

CROSS-REFERENCE TO RELATED APPLICATION

This application is a Continuation application of Ser. No. 12/839,852, filed Jul. 20, 2010, issued as U.S. Pat. No. 8,577,198 on Nov. 5, 2013, which is a Continuation application of Ser. No. 11/743,941, filed May 3, 2007, issued as U.S. Pat. No. 7,760,984 on Jul. 20, 2010, which claims the benefit of U.S. Provisional Patent Application Ser. No. 60/797,890, filed May 4, 2006, which application is hereby incorporated by reference in its entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 110 that connects a number of end subscribers 115 (also called end users 115 herein) in a network. The central office 110 can additionally connect to a larger network such as the Internet (not shown) and a public switched telephone network (PSTN). The network 100 can also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits.

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations can include fewer or more fibers. The portion of network 100 that includes an FDH 130 and a number of end users 115 can be referred to as an F2 portion of network 100. The network 100 includes a plurality of break-out locations 125 at which branch cables are separated out from main cable lines. Branch cables are often connected to drop terminals 104 that include connector interfaces for facilitating coupling the fibers of the branch cables to a plurality of different subscriber locations.

Splitters used in an FDH 130 can accept a feeder cable having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 130 as required.

SUMMARY

Certain aspects of the disclosure relate to fiber distribution hubs (FDHs) that provide an interface between the F1 portion of the network and an F2 portion of the network. Certain aspects relate to features adapted to enhance access to components within the FDHs. Other aspects relate to features that enhance cable management, ease of use, and scalability. Still other aspects relate to features that inhibit water intrusion into the FDHs.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 15 is a top view of the fiber distribution hub of FIG. 11;

FIG. 16 is a bottom view of the fiber distribution hub of FIG. 11;

FIG. 21 is a rear view of the swing frame of FIG. 20;

FIG. 22 is a left side view of the swing frame of FIG. 20;

FIG. 23 is a right side view of the swing frame of FIG. 20;

FIG. 24 is a top view of the swing frame of FIG. 20;

FIG. 25 is a bottom view of the swing frame of FIG. 20;

FIG. 29 is a cabling diagram for routing a split fiber from the splitter module to the storage module; and FIG. 30 is a cabling diagram for routing a split fiber from the splitter module to the termination module.

DETAILED DESCRIPTION

Figure 2:
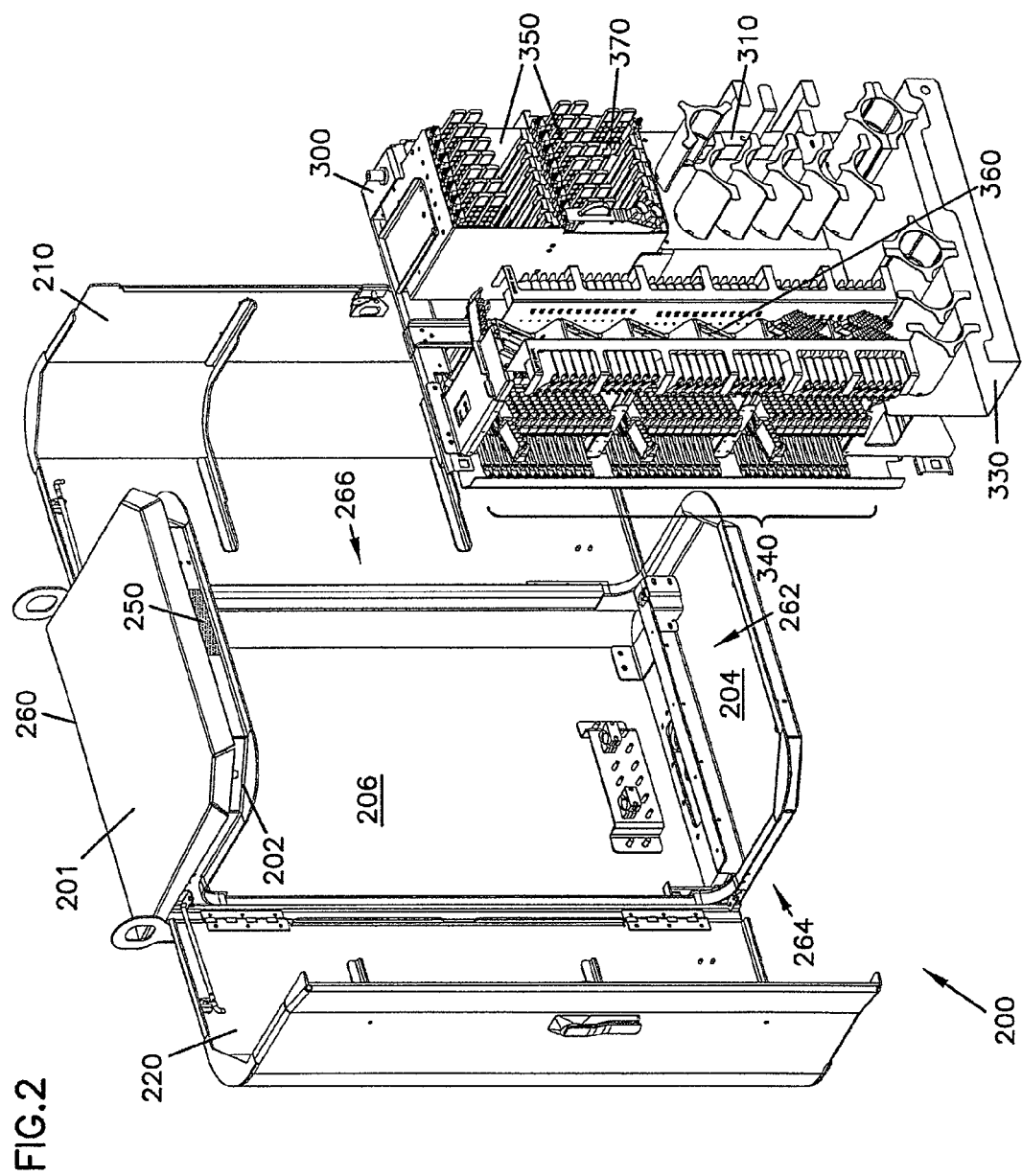
FIG. 2 shows a perspective view of an example fiber distribution hub with the doors in an open position and the swing frame detached.
Figure 3:
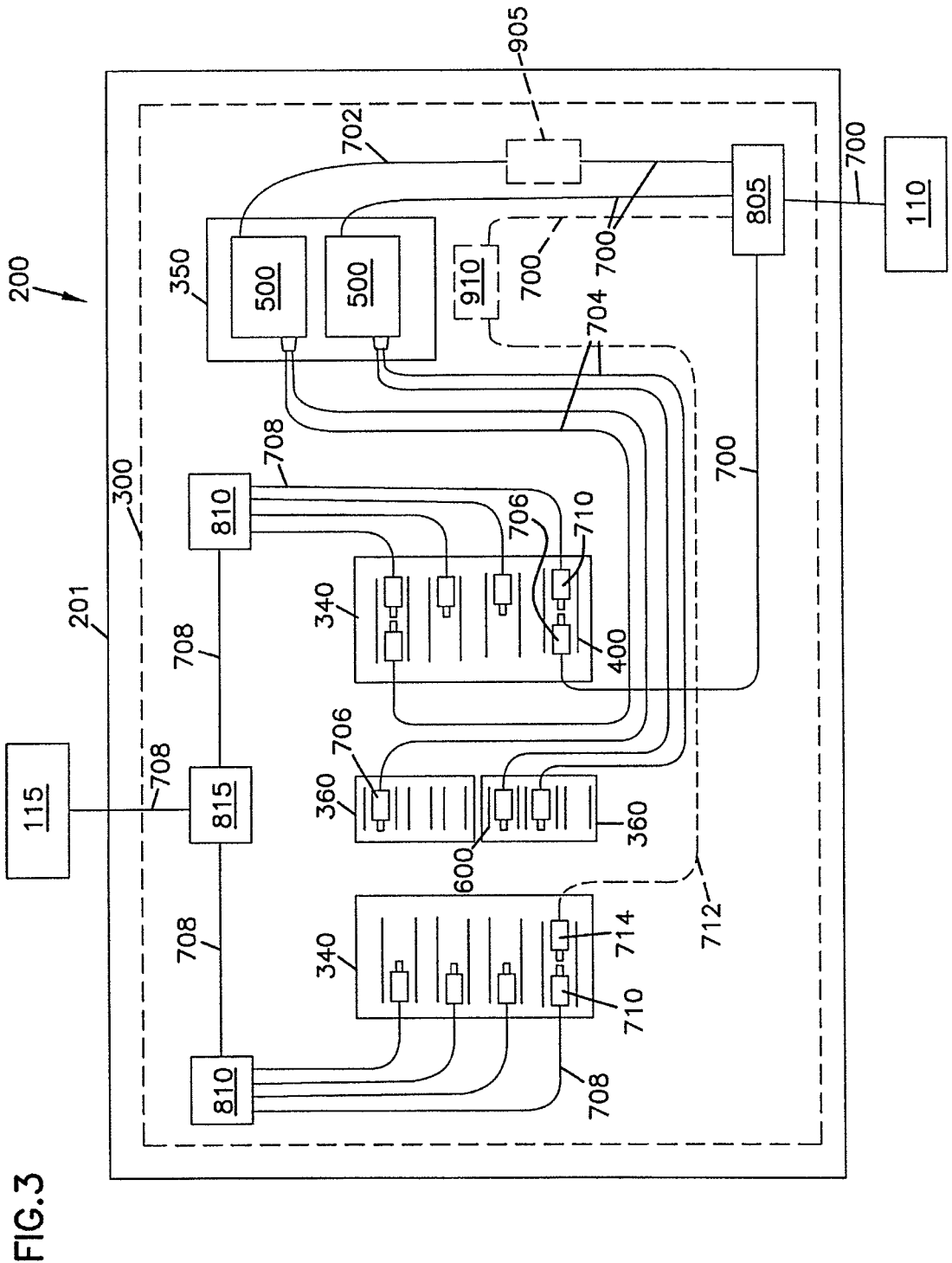
FIG. 3 is a schematic diagram showing an example cable routing scheme for the fiber distribution hub of FIG. 2.
Figure 5:
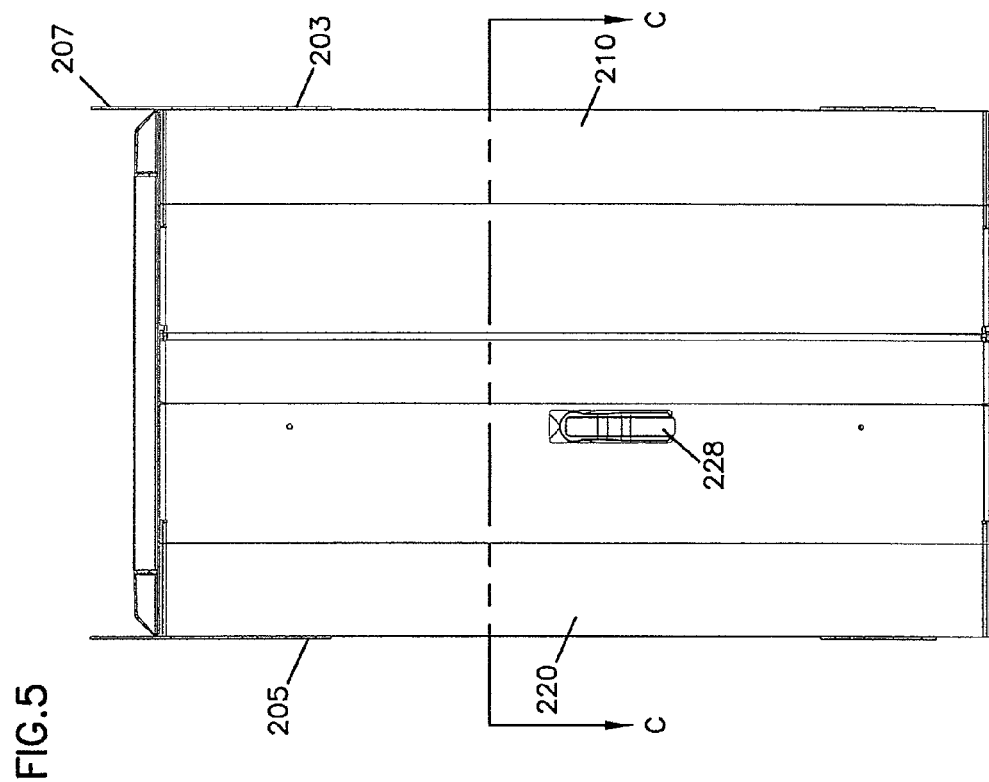
FIG. 5 is a front view of the fiber distribution hub of FIG. 4.
Figure 4:
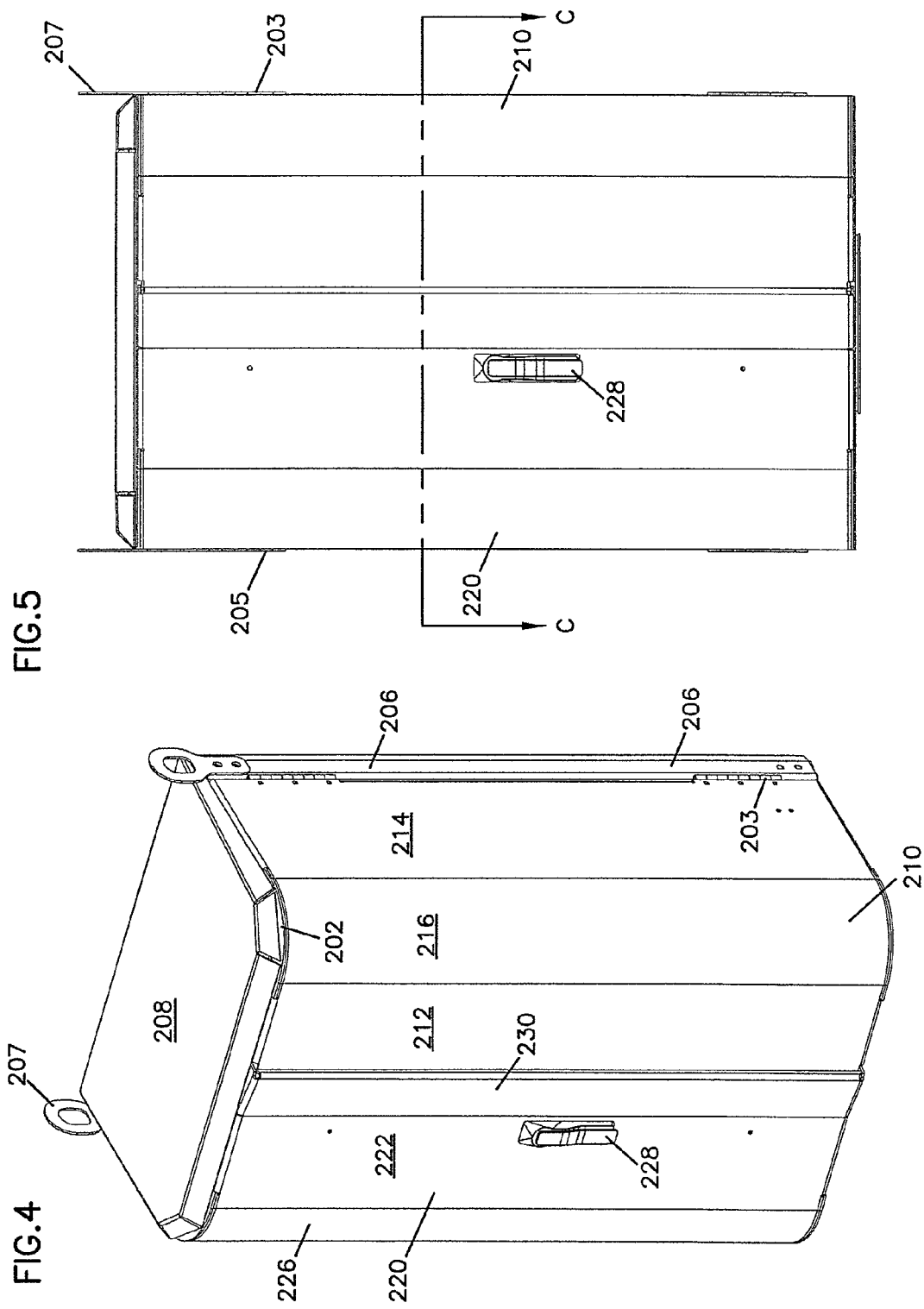
FIG. 4 is a front perspective view of the fiber distribution hub of FIG. 2 with doors in the closed position.
Figure 7:
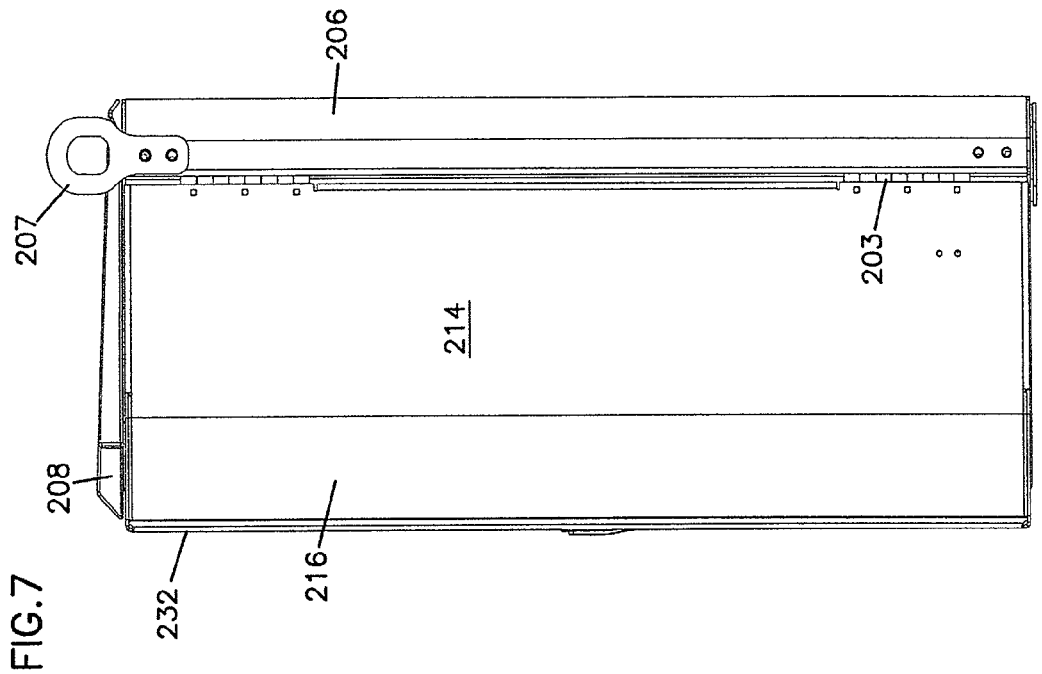
FIG. 7 is a right side view of the fiber distribution hub of FIG. 4.
Figure 6:
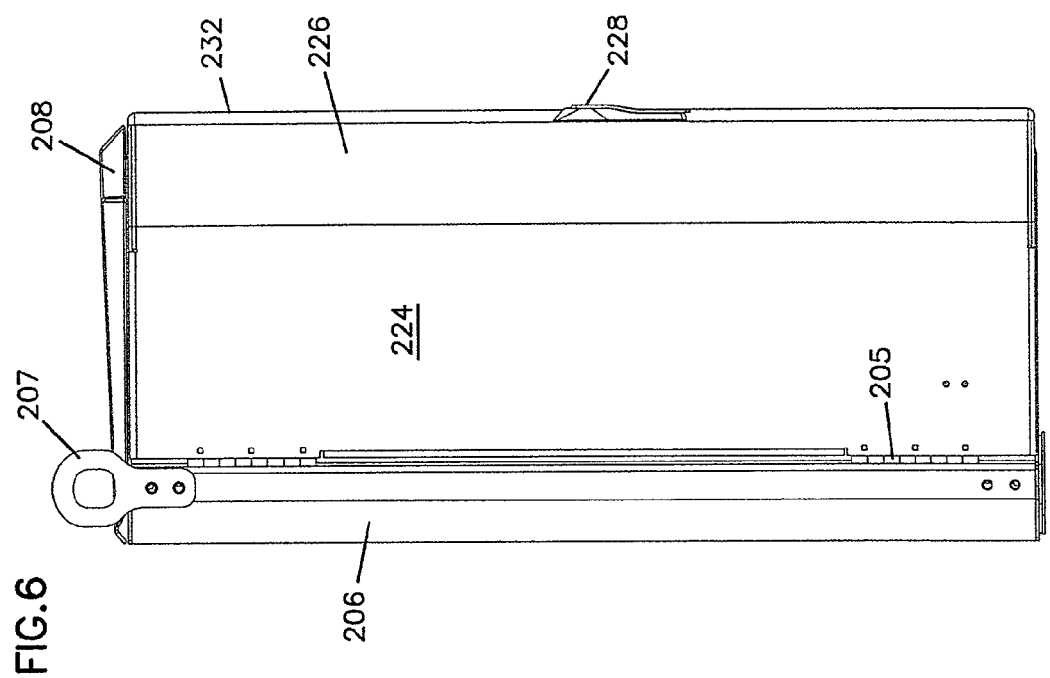
FIG. 6 is a left side view of the fiber distribution hub of FIG. 4.

Referring now to FIGS. 2-3, an example fiber distribution hub (FDH) 200 is shown. The FDH 200 includes a cabinet 201 that houses internal components. The cabinet 201 includes a main body 260 having a back panel 206 extending between a first end panel 202 and a second end panel 204. The main body 260 of the cabinet 201 defines a front opening 262 and side openings 264, 266 (best shown in FIG. 15). Right and left doors 210, 220 wrap around the sides and front of the cabinet 201. The doors 210, 220 are hingedly mounted to the rear of the main body 260 of the cabinet 201 and move between a closed position (see FIG. 4) and an open position (see FIG. 11). A first gasket 255 (see FIG. 11) can be provided adjacent an edge of one of the doors 210, 220. Edges of the main body 260 can also be lined with a second gasket 250 (see FIG. 11) adapted to seal the cabinet 201 from contaminants when the doors 210, 220 are in the closed position. The cabinet 201 also includes an opening 240 (see FIG. 10) through which a feeder cable (i.e., or F1 cable) 700 and a subscriber cable (i.e., or F2 cable) 708 enter and exit the cabinet 201 (FIG. 3).

A swing frame 300 is pivotably mounted within the main body 260 of the cabinet 201. In general, the swing frame 300 includes at least one termination region 340 and at least one splitter region 350. The termination region 340 is configured to retain adapters, such as the adapters of termination module 400 (see FIG. 19), and the splitter region 350 is configured to retain at least one splitter, such as splitter module 500 (see FIG. 26). In some embodiments, the swing frame 300 also includes a storage region 360 configured to retain at least one storage module 600 (see FIG. 26). In other embodiments, the swing frame 300 includes a pass-through region 370. Typically, the swing frame 300 includes a cable management panel 310 and a trough 330 for routing fibers between regions 340, 350, 360, 370 (FIGS. 17 and 18).

FIG. 3 is a schematic diagram showing an example cable routing scheme for the FDH 200. The FDH 200 generally administers connections at a termination panel between incoming fiber and outgoing fiber in an Outside Plant (OSP) environment. As the term is used herein, "a connection" between fibers includes both direct and indirect connections. Examples of incoming fibers include the feeder cable fibers that enter the cabinet and intermediate fibers that connect the feeder cable fibers to the termination region (e.g., connectorized pigtails extending from splitters and patching fibers/jumpers). Examples of outgoing fibers include the subscriber cable fibers that exit the cabinet and any intermediate fibers that connect the subscriber cable fibers to the termination region. The termination region of the FDH 200 provides an interconnect interface for optical transmission signals at a location in the network where operational access and reconfiguration are desired. For example, as noted above, the FDH 200 can be used to split the feeder cables and terminate the split feeder cables to distribution cables routed to subscriber locations 115. In addition, the FDH 200 is designed to accommodate a range of alternative sizes and fiber counts and support factory installation of pigtails, fanouts and splitters.

Figure 17:
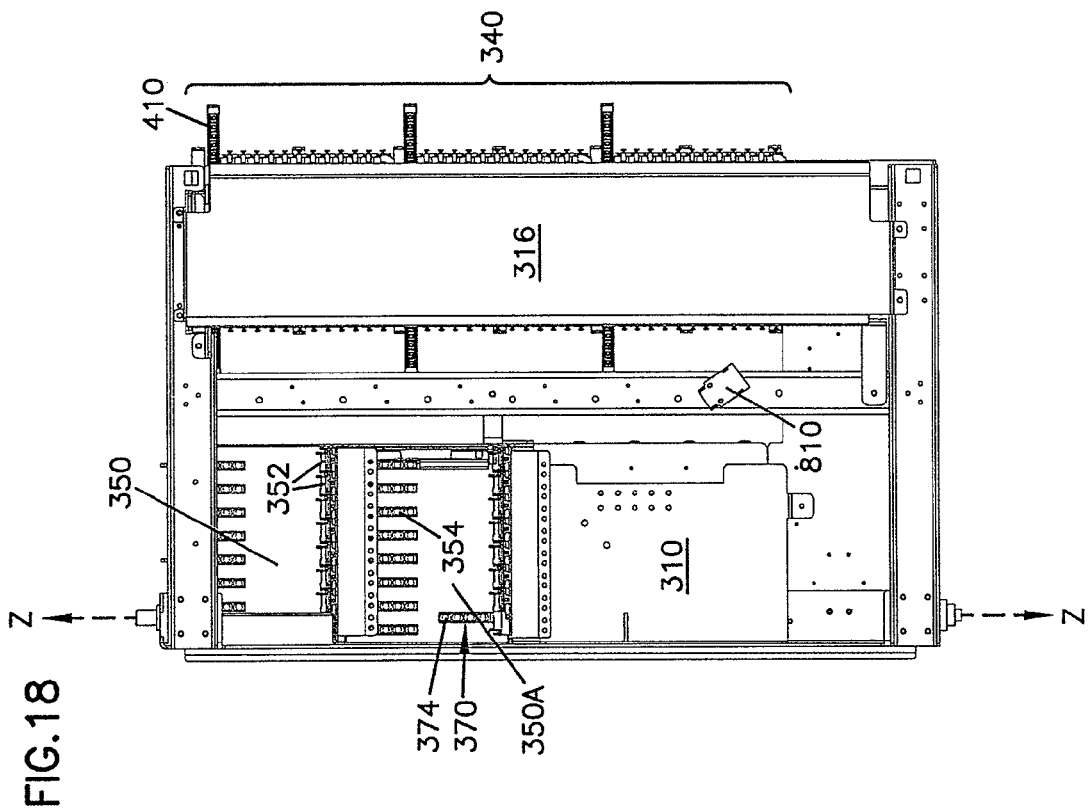
FIG. 17 is a front perspective view of the fiber distribution hub of FIG. 2 with the doors in the open position and the swing frame swung out.
Figure 18:
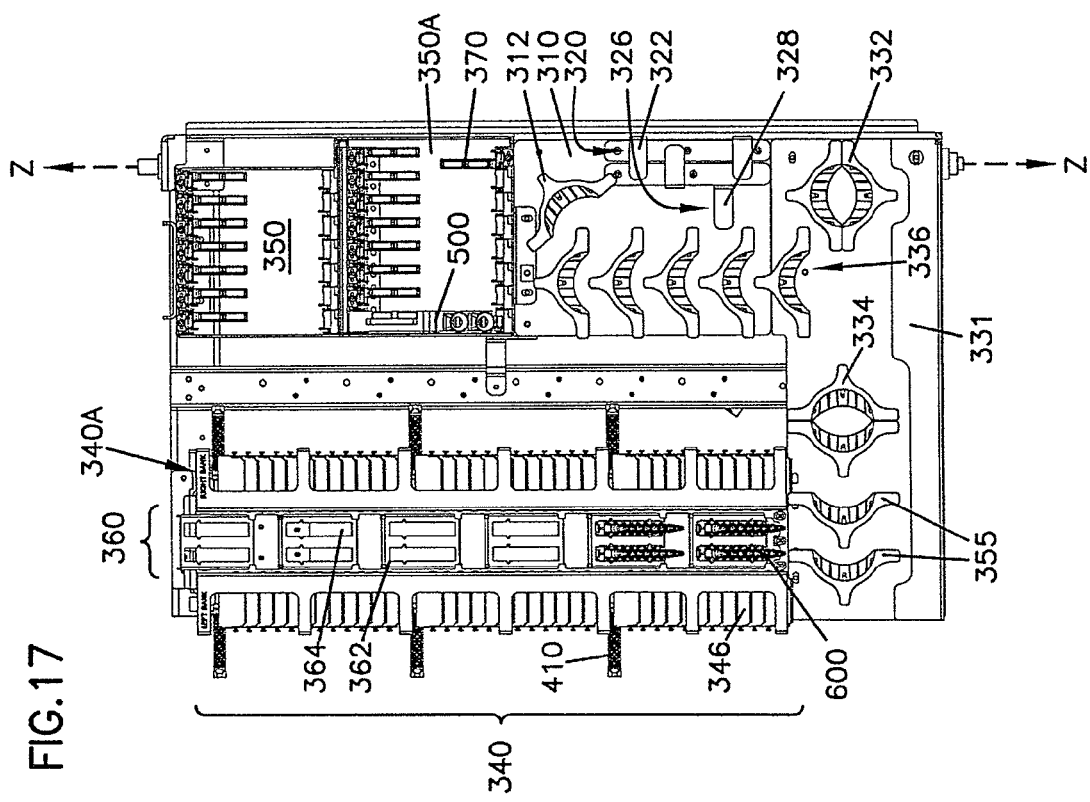
FIG. 18 is a left side view of the fiber distribution hub of FIG. 17.
Figure 20:
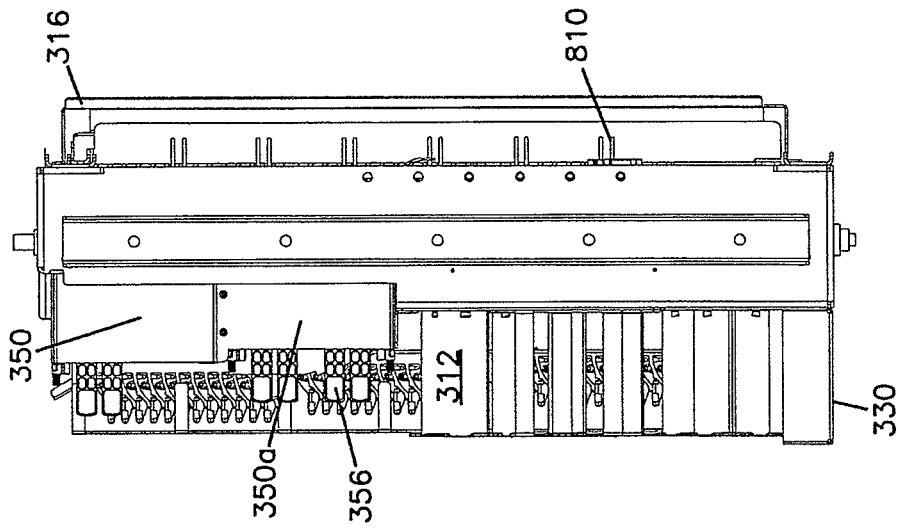
FIG. 20 is a front view of an example swing frame.

As shown at FIG. 3, a feeder cable 700 is initially routed into the FDH 200 through the cabinet 201 (e.g., typically through the back or bottom of the main body 260 as shown in FIG. 17). In certain embodiments, the fibers of the feeder cable 700 can include ribbon fibers. An example feeder cable 700 may include twelve to forty-eight individual fibers connected to a service provider central office 110. After entering the cabinet 201, the fibers of the feeder cable 700 are routed to a fanout device 805. The fanout device 805 separates the fibers of the feeder cable 700. The fanout device 805 can also upjacket the fibers of the feeder cable 700. In some embodiments, the separated feeder cable fibers 700 are routed from the fanout device 805 to the splitter region 350. At the splitter region 350, the feeder cable fibers 700 are connected to separate splitter modules 500, in which the fibers 700 are each split into multiple pigtails 704, each having connectorized ends 706. In other embodiments, however, the fibers of the feeder cable 700 can be routed to a feeder cable interface 905 (e.g., a fiber optic adapter module, a splice tray, etc.). At the feeder cable interface 905, one or more of the fibers of the feeder cable 700 are individually connected to separate splitter input fibers 702 that are routed to the splitter region 350.

Figure 1:
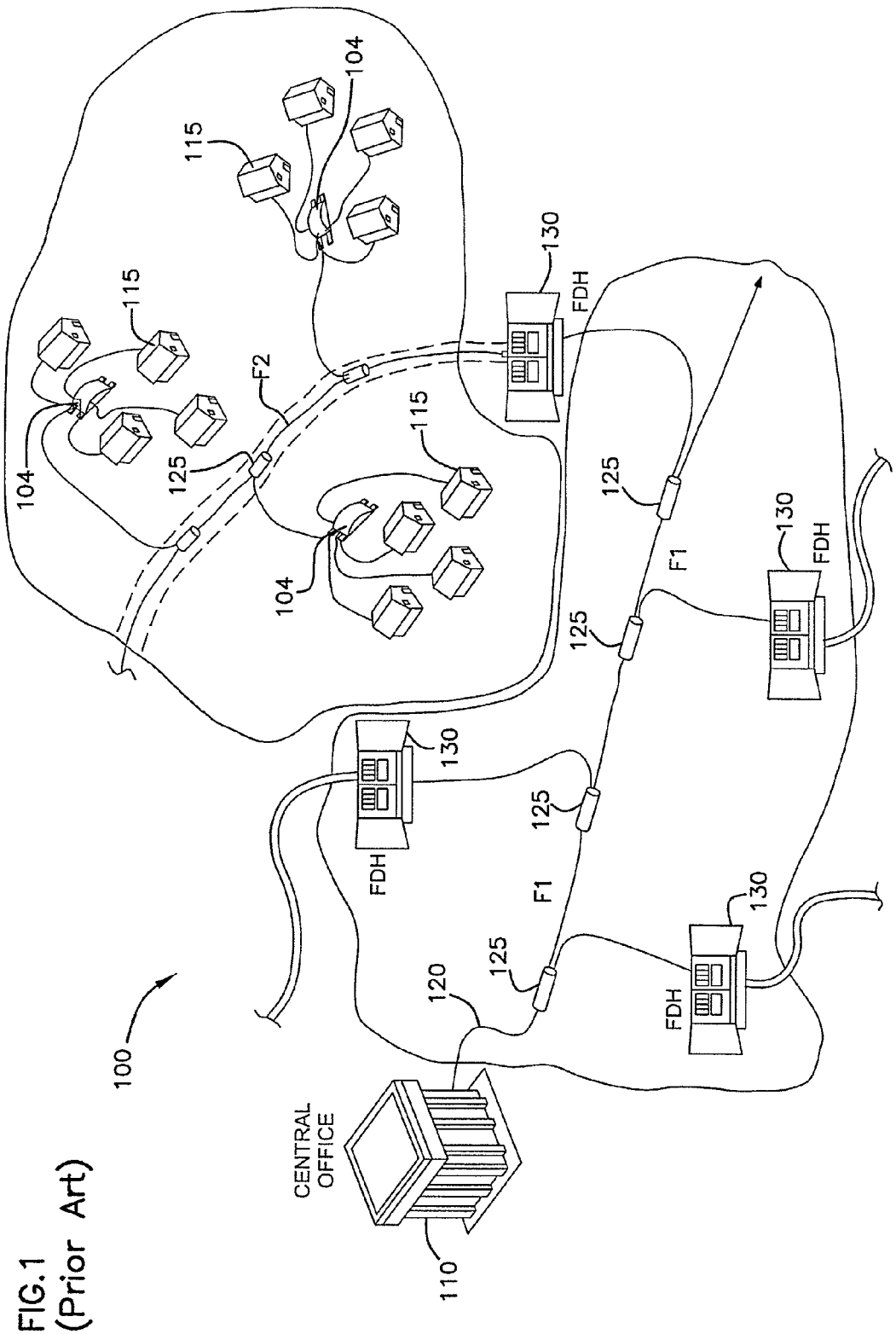
FIG. 1 shows a prior art passive fiber optic network.

When the splitter pigtails 704 are not in service, the connectorized ends 706 can be temporarily stored on a storage module 600 that is mounted at the storage region 360 of the swing frame 300. When the pigtails 704 are needed for service, the pigtails 704 are routed from the splitter modules 500 to a termination module 400 that is provided at the termination region 340 of the swing frame 300. At the termination module 400, the pigtails 704 are connected to the fibers of a distribution cable 708. The termination module 400, therefore, is the dividing line between the incoming fibers and the outgoing fibers. A typical distribution cable 708 forms the F2 portion of a network (see FIG. 1) and typically includes a plurality of fibers (e.g., 144, 216 or 432 fibers) that are routed from the FDHs 130 to subscriber locations 115.

In some embodiments, one or more of the fibers of the feeder cable 700 are not connected to any of the splitter modules 500. Rather, these fibers of the feeder cable 700 are connected through an interface device 910 to pass-through fibers 712 having connectorized ends 714. The connectorized ends 714 of the pass-through fibers 712 are connected to the subscriber cable fibers 708 at the termination region 340 of the swing frame 300 without first connecting to the splitter region 350. By refraining from splitting a fiber 700, a stronger signal can be sent to one of the subscribers 115. The connectorized ends 714 of the pass-through fibers 712 can be stored at the storage region 360 of the swing frame 300 when not in use. In other embodiments, however, a feeder cable 700 having a connectorized end can be routed directly to the termination region 340 of the swing frame 300.

Referring now to FIGS. 4-10, an example cabinet 201 of a FDH 200 is shown in a closed position. In general, the cabinet 201 is relatively lightweight for easy installation, and breathable to prevent accumulation of moisture in the unit. In some embodiments, an aluminum construction with a heavy powder coat finish also provides for corrosion resistance. In one example embodiment, the cabinet 201 is manufactured from heavy gauge aluminum and is NEMA-4X rated. In other embodiments, however, other materials can also be used.

The cabinet 201 includes a main body 260, a right door 210, and a left door 220. The doors 210, 220 are pivotally mounted to the main body 260 of the cabinet 201 with hinge arrangements 203, 205 to facilitate access to components mounted within the main body 260. In one example embodiment, the hinge arrangements 203, 205 each include two spaced hinges. In some embodiments, the doors 210, 220 are mounted at the rear of the main body 260 of the cabinet 201.

Each door 210, 220 includes a front portion 212, 222, respectively, a side portion 214, 224, respectively, and a connecting portion 216, 226, respectively, that enable the doors 210, 220 to wrap around the side openings 264, 266 and front opening 262 of the main body 260 of the cabinet 201. When closed, the side portions 214, 224 of the doors 210, 220 extend between the rear of the main body 260 and the front of the main body 260. The front portions 212, 222 extend across the front of the main body 260. In one embodiment, the connecting portions 216, 226 arc between the front portions 212, 222 and the side portions 214, 224. In other embodiments, however, the connecting portions 216, 226 extend linearly between the front portions 212, 222 and the side portions 214, 224. Typically, the doors 210, 220 also include a lock feature 218 (FIG. 11) and a handle 228. Opening the doors 210, 220 facilitates access to the internal components of the cabinet 201.

Figure 10:
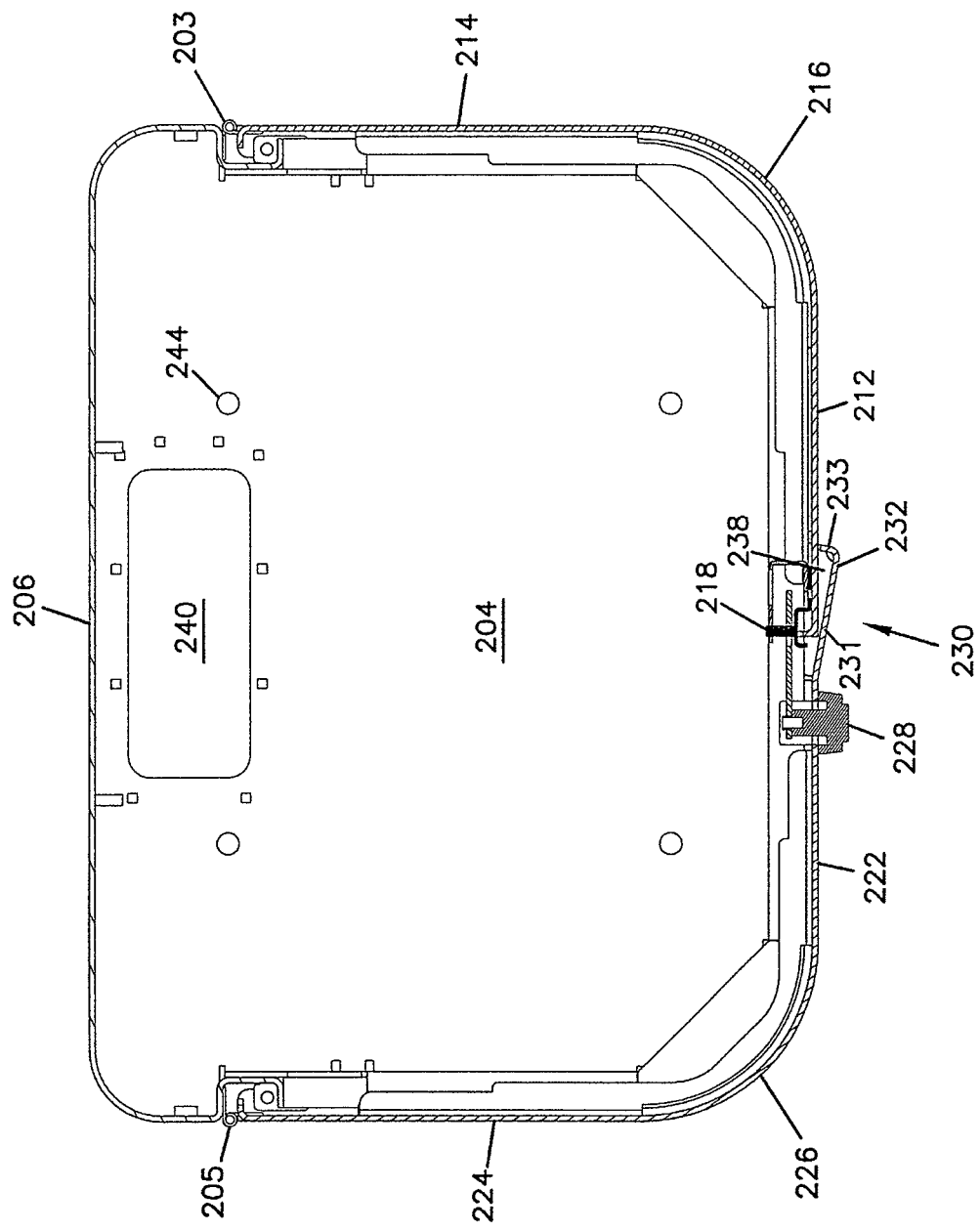
FIG. 10 is a cross-sectional view of the fiber distribution hub of FIG. 4 along lines C of FIG. 5.

In some embodiments, one of the doors 210, 220 includes an angle feature 230 (FIG. 11) enabling the doors 210, 220 to overlap along a centerline of the front of the cabinet 201. The angle feature 230 includes a flange 232 (FIG. 10) extending outwardly from the front portion 222 of the door 220 to form a channel 238. As shown in FIG. 10, the flange 232 has a generally L-shaped cross-section including a first portion 231 aligned at an obtuse angle relative to the front portion 222 of the door 220 and a second portion 233 that extends rearwardly from the first portion 231. End flanges 234, 236 (see FIG. 11), located on either end of flange 232, substantially close off the vertical channel 238.

Figure 11:
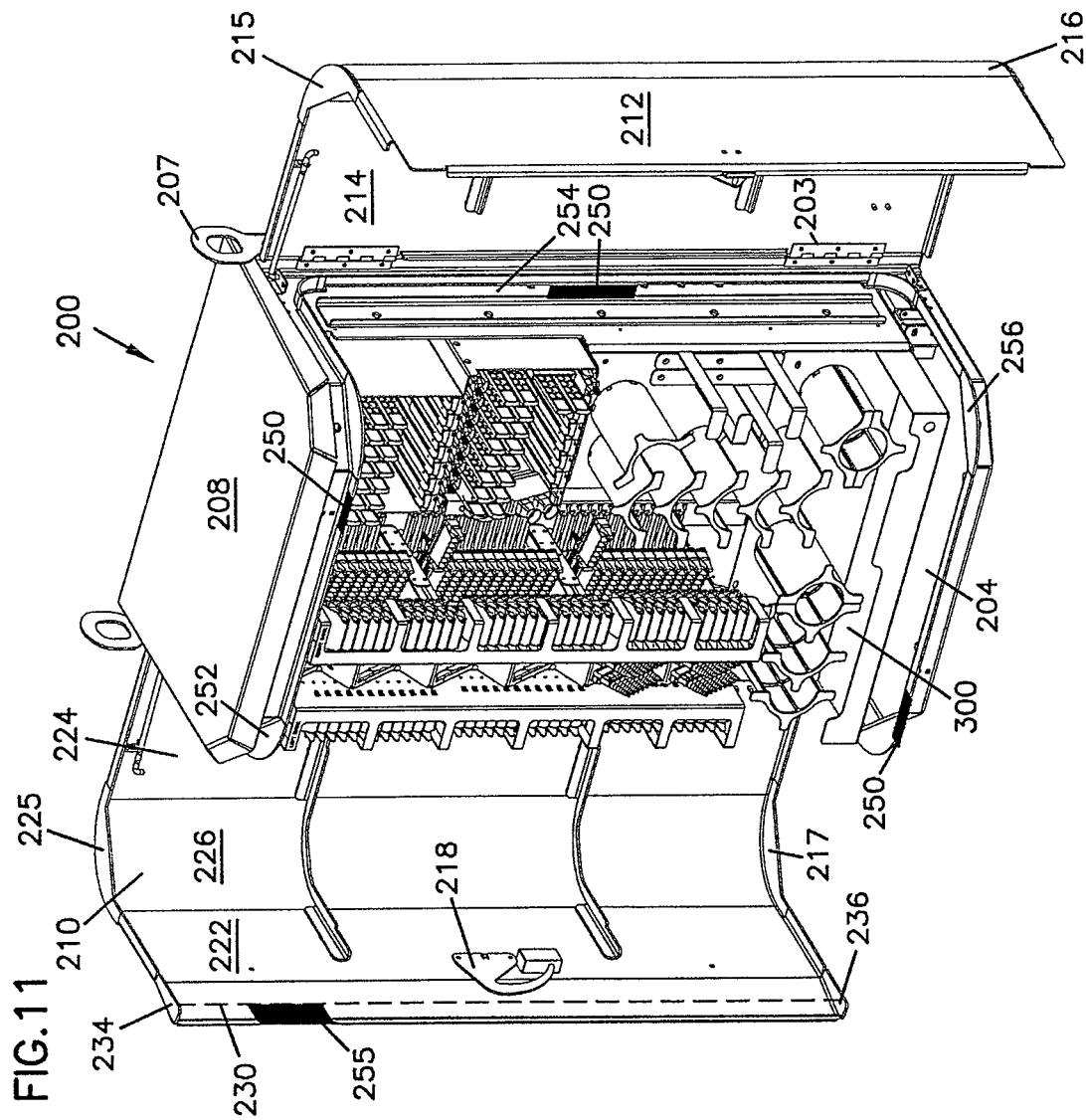
FIG. 11 is a front perspective view of a the fiber distribution hub of FIG. 2 with doors in the open position.
Figure 12:
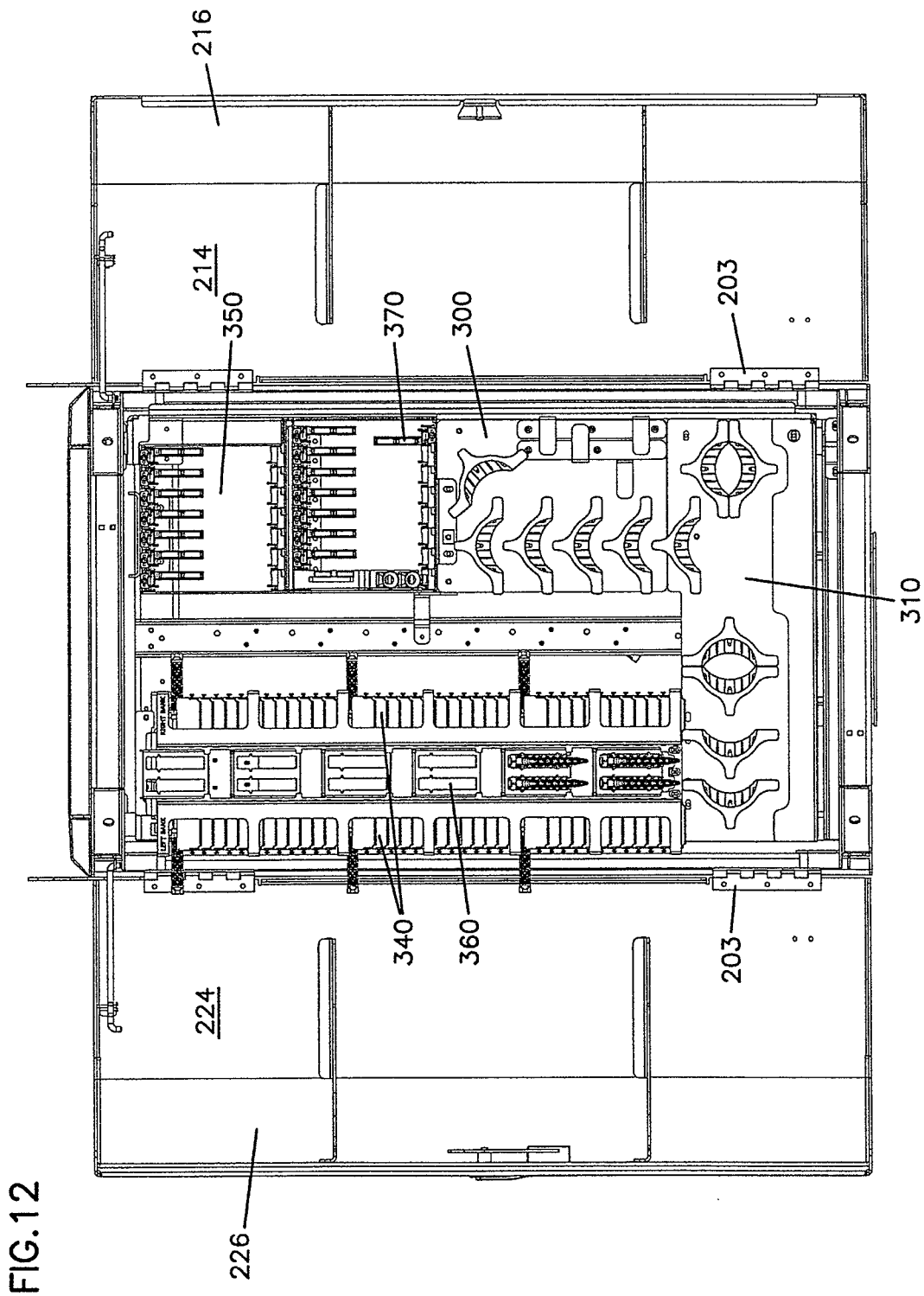
FIG. 12 is a front view of the fiber distribution hub of FIG. 11.
Figure 14:
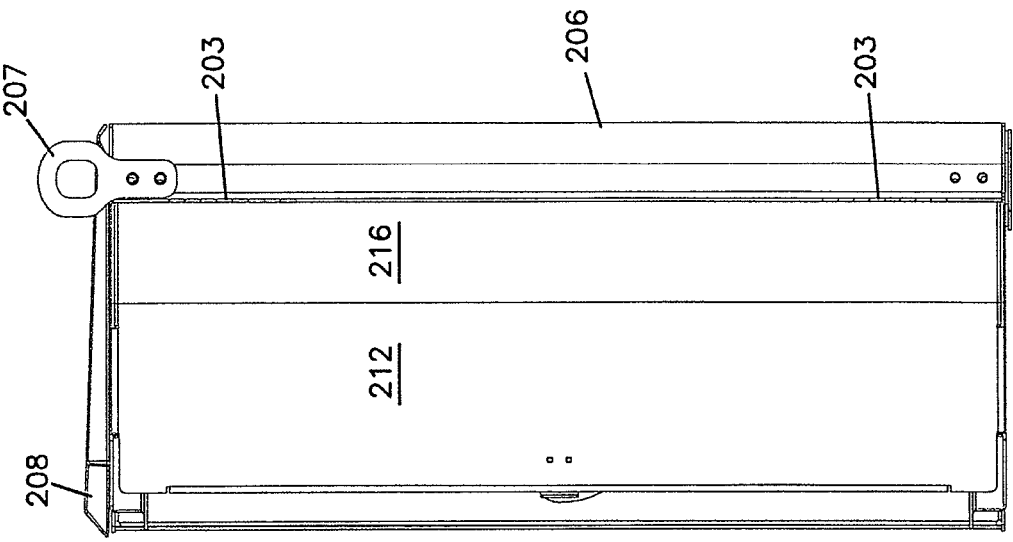
FIG. 14 is a right side view of the fiber distribution hub of FIG. 11.
Figure 13:
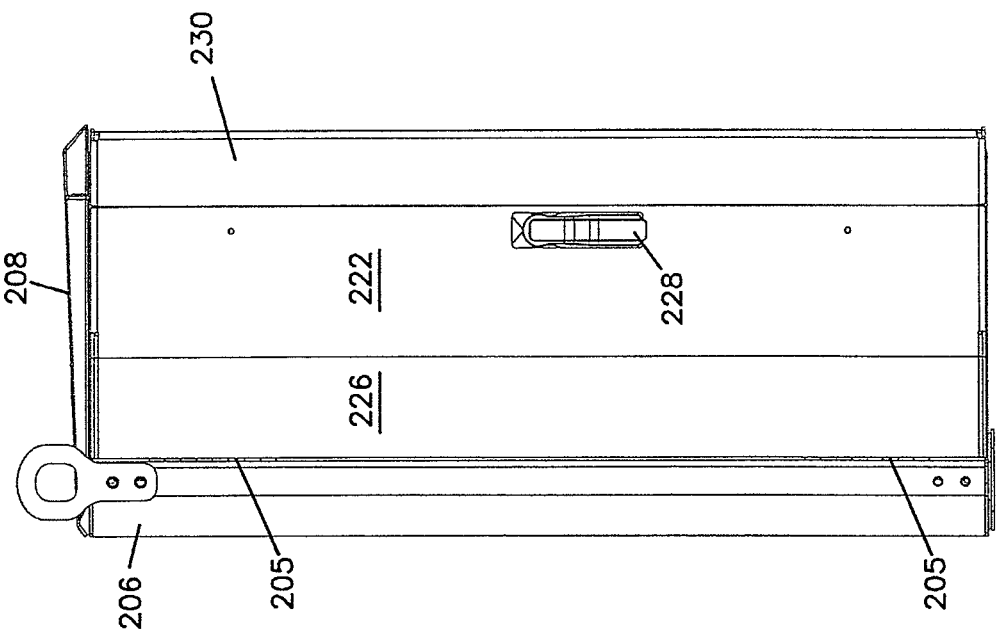
FIG. 13 is a left side view of the fiber distribution hub of FIG. 11.

In some embodiments, the angle feature 230 of the doors 210, 220 includes a first gasket 255 for sealing the centerline of the doors 210, 220 when the cabinet 201 is closed. A portion of the first gasket 255 is shown in FIG. 11 lining the angle feature 230. In such embodiments, the first and second portions 231, 233 of the angle feature 230 are sized and angled to provide space for the first gasket 255. When the doors 210, 220 are closed, the second portion 233 of the angle feature 230 abuts against the front portion 212 of door 210 and the gasket/seal 255 is compressed between the first portion 231 of the angle feature 230 and an edge of the door 220. The first gasket 255 preferably extends vertically along the first portion 231 of the angle feature 230 from end flange 234 to end flange 236.

Referring back to FIG. 2, the main body 260 of the cabinet 201 includes a back panel 206 extending between a first end panel 202 and a second end panel 204. The second end panel 204 includes an access opening 240 (FIG. 10) through which the feeder cable 700 and the subscriber cable 708 enter and exit the main body 260 of the cabinet 201. Both the first and second end panels 202, 204 include mounting holes 244 (see FIGS. 9 and 10) for deploying the cabinet 201. By providing the mounting holes 244 in both end panels 202, 204, the main body 260 of the cabinet 201 can be deployed in either a pedestal mount or an aerial mount orientation.

Figure 9:
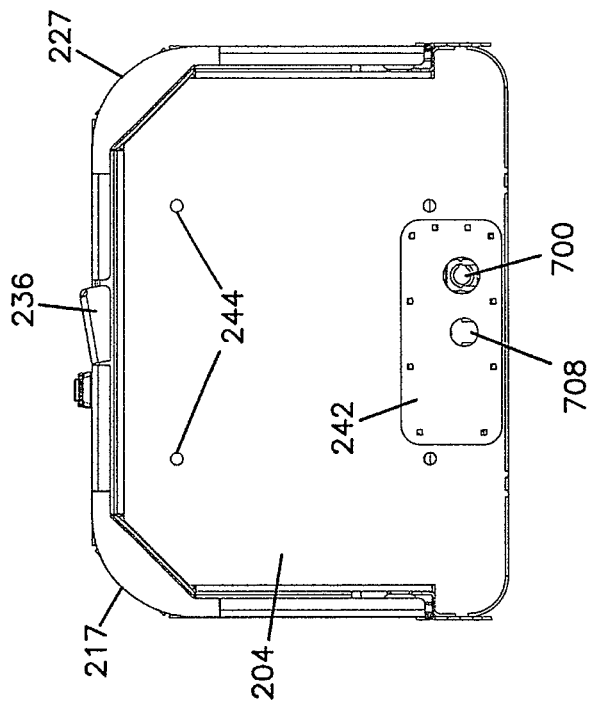
FIG. 9 is a bottom view of the fiber distribution hub of FIG. 4.
Figure 8:
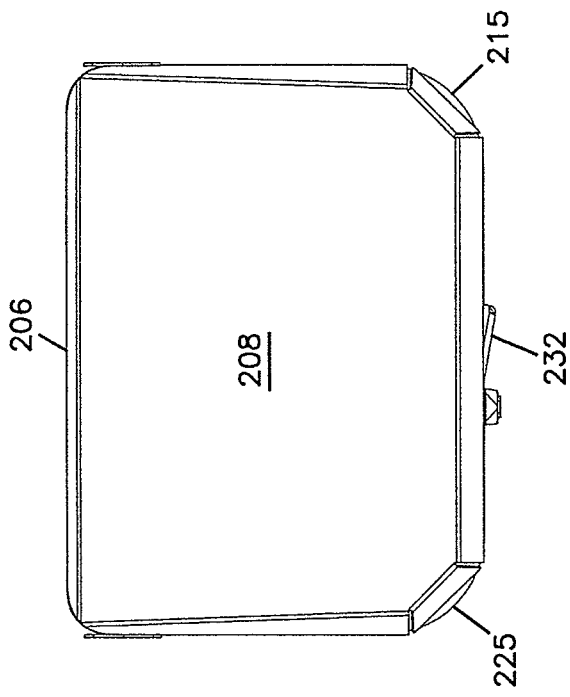
FIG. 8 is a top view of the fiber distribution hub of FIG. 4.

During assembly, in some embodiments, the cabinet 201 is adapted to be secured to a pedestal mount. In such cases, the main body 260 is oriented so that the first end panel 202 is at the top of the cabinet 201 and the second end panel 204 is at the bottom of the cabinet 201. (FIG. 2). The access opening 240 of the second end panel 204 is covered with an access panel 242 defining an opening sized to fit the feeder cable 700 and an opening sized to fit the subscriber cable 708 (FIG. 9). Internal components are loaded into the main body 260 of the cabinet 201. The door 210 is mounted to hinge arrangement 203 and the door 220 is mounted to hinge arrangement 205.

Figure 27:
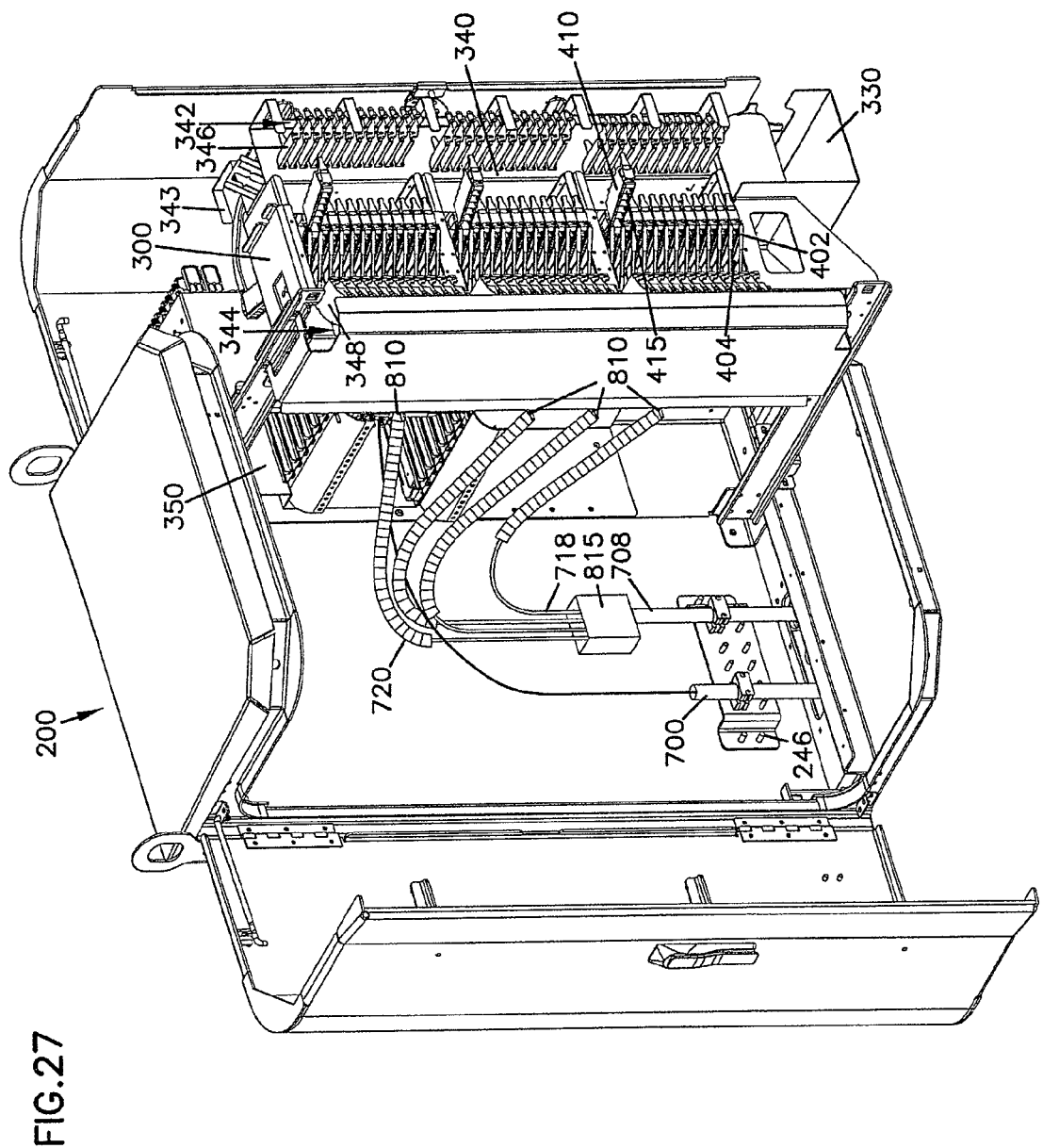
FIG. 27 shows precabling of the splitter and termination modules of the fiber distribution hub of FIG. 17.

During field installation of such a cabinet 201, the second end panel 204 (i.e., the bottom panel) of the cabinet 201 is fastened to a pad via mounting holes 244. A feeder cable 700 and a subscriber cable 708 can be routed upwardly through the access opening 240 and the access panel 242 (FIG. 27). A cover 208 (FIG. 4-8) is configured to mount over the end panel 202 (i.e., the top panel). In some embodiments, the cover 208 improves the overall aesthetic appearance of the cabinet 201. In other embodiments, the cover 208 shields the four mounting holes 244 of the end panel 202 to prevent water, dirt, and other contaminants from accessing the FDH 200. In one example embodiment, the cover 208 has a pitched surface to enable water to run off of the cover 208 when the FDH 200 is pedestal mounted.

In other embodiments, however, the cabinet 201 is intended to be secured to an aerial mount. During assembly in such cases, the main body 260 of the cabinet 201 is oriented so that the first end panel 202 is at the bottom of the cabinet 201 and the second end panel 204 is at the top of the cabinet 201. The access opening 240 of the second end panel 204 is still covered with an access panel 242. However, the access panel 242 is located on the top of the cabinet 201. In such an orientation, the door 210 mounts to hinge arrangement 205 and the door 220 mounts to hinge arrangement 203.

During field installation of an aerial mount FDH 200, the cabinet 201 is mounted on a pole by a pole mount configuration (not shown) having a platform on which the first end panel 202 (i.e., the bottom panel) of the cabinet 201 rests. The mounting holes 244 of the first end panel 202 enable the cabinet 201 to be fastened to the platform. At least one aerial feeder cable 700 and subscriber cable 708 can be routed downwardly into the cabinet 201 through the access opening 240. The access panel 242 covers the access opening 240 while enabling the feeder cable 700 and subscriber cable 708 to enter the cabinet 201.

In certain embodiments, the cabinet 201 can include one or more carry loops 207 for facilitating deployment of the cabinet 201 at a desired location. For example, the loops 207 can be used to position the cabinet using a crane. In particular, the crane can lower the cabinet 201 into an underground region. The carry loops 207 are located adjacent to the cover 208. In some embodiments, the loops 207 are removable or can be adjusted to not protrude past the cover 208.

Referring now to FIGS. 11-16, the example FDH 200 is shown in an open position. In the open position, the doors 210, 220 are oriented to enable access to the front opening 262 and side openings 264, 266 (FIG. 15), defined by the main body 260 of the cabinet 201. In one embodiment, the doors are oriented so that the side portions 214, 224 are substantially parallel to the back panel 206 of the main body 260 and the front portions 212, 222 are substantially perpendicular to and spaced from the back panel 206. Opening the cabinet 201 in this way enables a user to access not only the front of the cabinet, but also the sides.

The cabinet 201 of the FDH 200 is configured to protect the internal components against rain, wind, dust, rodents and other contaminants. To accomplish this goal, in some embodiments, the cabinet 201 includes a second gasket 250 (best seen in FIG. 11) lining the edges 252, 254, 256 of the first end panel 202, the back panel 206 and the second end panel 204, respectively, where the panels 202, 204, 206 interface with the doors 210, 220. For the sake of clarity, only portions of the second gasket 250 are illustrated along the edges 252, 254, 256 in FIG. 11. However, it may be appreciated that the gasket 250 extends around the entire perimeter of the door interface.

Referring now to FIGS. 17-22, opening the doors 210, 220 enables a user to access the swing frame 300 pivotably mounted within the cabinet 201. Typically, the swing frame 300 is installed in the rear of the cabinet 201 after an orientation of the cabinet 201 has been determined. FIGS. 17-22 illustrate an example swing frame 300 separate from the cabinet 201. The swing frame 300 has a front 302, a rear 304, a left side 303, and a right side 305 (FIGS. 21 and 22).

In some embodiments, the swing frame 300 has a pivot axis Z extending through the swing frame 300 from the top of the swing frame 300 to the bottom. For example, as shown in FIG. 17, the pivot axis Z extends though the swing frame 300 on the right side 305. The swing frame 300 can be pivoted on the axis Z through the opening defined by the main body of the cabinet 201 when the doors 210, 220 are open. In particular, the swing frame 300 pivots between a first "swung in" position (see FIG. 11) in which the swing frame 300 fits within the footprint of the cabinet 201 and a second "swung out" position (best seen in FIG. 23) in which the swing frame 300 pivots out of the cabinet 201. As shown in FIG. 23, in one embodiment, the swing frame 300 can be swung out of the cabinet 201 at an angle of about 90 degrees.

The swing frame 300 includes at least one termination region 340, at least one storage region 360, at least one splitter region 350, and at least one pass-through region 370. Each termination region 340 is configured to hold at least one termination module 400 (FIG. 19) and each splitter region 350 is configured to hold at least one splitter module 500. Each storage region 360 is configured to hold at least one storage module 600 (best seen in FIG. 26). The termination, splitter, and storage modules 400, 500, 600, respectively, will be described with more detail with reference to FIG. 26. As shown in FIG. 3, the pass-through region 370 enables a feeder cable 700, or intermediate fiber 712, to interface with a subscriber distribution-cable 708 without first splitting the feeder cable 700.

In the embodiment shown in FIG. 17, the left side 303 of the swing frame 300 includes a storage region 360 located on the front 302 of the swing frame 300 between a first termination region 340 and a second termination region 340A. The opposite side 305 of the swing frame 300 includes a first splitter region 350 located above a second splitter region 350A. A pass-through region 370 is located adjacent the second splitter region 350A. In other embodiments, however, the swing frame 300 can include any desired number of termination regions 340, storage regions 360, and splitter regions 350. The regions 340, 350, 360, and 370 can be arranged in any desired configuration on the swing frame 300.

In some embodiments, the swing frame 300 also includes a cable management panel 310 (see FIG. 17) for aid in routing fiber from one component module to another. In the example shown, the cable management panel 310 includes a bend limiter 312 oriented to direct splitter pigtails 704 (see FIG. 3) from the splitter modules 500 to a first channel 320. The first channel 320 is defined by an array of flanges 322. The flanges 322 protrude forwardly from the panel 310. The forward ends of the flanges 322 are bent towards the sides 303, 305 of the swing frame 300, thereby forming the channel 320. Flanges 328 similarly form a second channel 326 adjacent channel 320. An array of radius bend limiters 336 also protrudes from the cable management panel 310.

Figure 19:
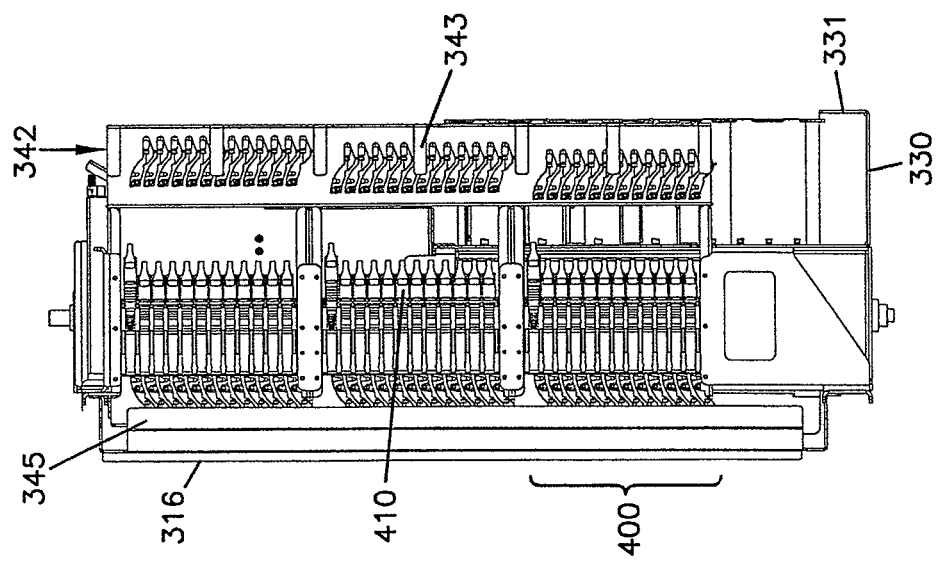
FIG. 19 shows the left side of FIG. 18, except that the left door of the cabinet has been removed in for ease in viewing.

The channels 320, 326 lead from the splitter region 350 to a trough 330 extending along the bottom of the swing frame 300 (FIG. 19). The trough 330 includes a flange 331 protruding upwardly to retain fiber in the trough 330. First and second slack storage spools 332, 334 are positioned above the trough. The first spool 332 is positioned adjacent the first and second channels 320, 326. The second spool 334 is positioned intermediate the array of bend limiters 336 and the termination regions 340, 340A. Additional bend limiters 335 can be located in the remaining area between the trough 330 and the termination regions 340, 340A.

FIG. 18 is a rear view of the swing frame 300 shown in FIG. 17. The termination region 340 is substantially hidden from view by a back panel 316. The splitter regions 350 and 350A, however, are visible from the rear side 304 of the swing frame 300. In particular, the splitter regions 350, 350A are configured to enable one or more splitter modules 500 to be slid into guides 352 in the splitter regions 350, 350A. Typically, the splitter modules 500 slide rearwardly into the guides 352 from the front side 302 of the swing frame 300. In some embodiments, adapter modules 354 are mounted to the splitter regions 350, 350A. The adapter modules 354 are adapted to receive an integral connector (not shown) projecting rearwardly from the splitter module 500. In certain embodiments, before a splitter module 500 is installed, dust caps 356 (see FIG. 20) can be mounted to the adapter module 354 to prevent dust and/or other contaminants from polluting the adapter module 354 prior to connection with the splitter module 500.

In the example shown, the pass-through region 370 is located adjacent the second splitter region 350A. In some embodiments, the pass-through region 370 includes at least one adapter module 374. The adapter module 374 is configured to accept a connectorized end of the feeder cable 700, or an intermediate cable (not shown), on one end and a connectorized end of a pass-through pigtail 712 on an opposite end. In other embodiments, however, the pass-through region 370 includes cable management devices (not shown) enabling the feeder cable 700 to be routed through the pass-through region 370 to the front side 302 of the swing frame 300.

One of the array of fanout devices 810 (see FIG. 18) is also visible adjacent the back panel 316. Typically, multiple fanout devices 810 are mounted adjacent the termination modules 400. The fanout devices 810 are configured to receive fibers from the subscriber cable 708 extending from the termination modules 400 and to combine the fibers 708 into ribbon cables.

FIG. 17 shows a storage region 360 positioned between a first termination region 340 and a second termination region 340A on the left side 305 of the swing frame 300. The storage region 360 includes at least one storage panel 362 that defines openings 364 in which the storage modules 600 can be mounted. In some embodiments, the panel 362 can be formed into angled shelves 366 (best seen in FIG. 26).

The first termination region 340 extends across the entire left side 305 of the swing frame 300. A forward portion of the termination region 340 defines a first channel 342 (best seen in FIGS. 21 and 27) and a rearward portion of the termination region 340 defines a second channel 344 (best seen in FIGS. 21 and 27). In particular, the first channel 342 is formed from bent flanges 343 (FIGS. 19 and 27), extending sideways and rearwardly from the storage region 360. The second channel 344 is formed from one or more bent flanges 345 extending sideways and forwardly from the back panel 316. An array of radius bend limiters 346, 348 is located within each channel 342, 344, respectively (FIGS. 17, 21, and 27). One or more termination modules 400 are located intermediate the channels 342, 344. The second termination region 340A is similarly formed (FIGS. 26 and 27).

Referring now to FIGS. 23-25, the pivot axis Z enables the opposite side 303 of the swing frame 300 to pass through the front opening 262 and side opening 266 when pivoted into the second position. In the example shown in FIG. 11, the front 302 of the swing frame 300, as well as substantial portions of side 303 and side 305 are accessible when the cabinet doors 210, 212 are in the open position and the swing frame 300 is contained within the cabinet 201. In contrast, as shown in FIG. 23, all of side 305 as well as the rear 304 of the swing frame 300 are accessible when the swing frame 300 is pivoted out of the cabinet 201.

Opening the doors 210, 220 and swinging out the frame 300 provides a large amount of space S (see FIG. 28) for accessing the rear side of the swing frame 300 and maneuvering around the interior of the cabinet 201. In particular, the provided space S extends across most of the back panel 206 and across the side portion 224 of the door 220. Providing such a space S facilitates access to the inside surface of the back panel 206 through the front opening 262 and the side opening 264. A cable support panel 246 is mounted to the inside surface of the back panel 206 above the access panel 242 in the second end panel 204 (FIG. 23). The cable support panel 246 is adapted to retain a feeder cable 700 and a subscriber cable 708 entering/exiting the cabinet 201 of the FDH 200 (see FIG. 27). Above the cable support 246 is a fanout device 815 adapted to combine support cable fibers 708 or ribbon cables formed therefrom into a single cable. The large amount of maneuvering room provided by the doors 210, 220 facilitates routing the feeder cable 700 to the splitter region 350 or the pass-through region 370 of the swing frame 300.

Figure 26:
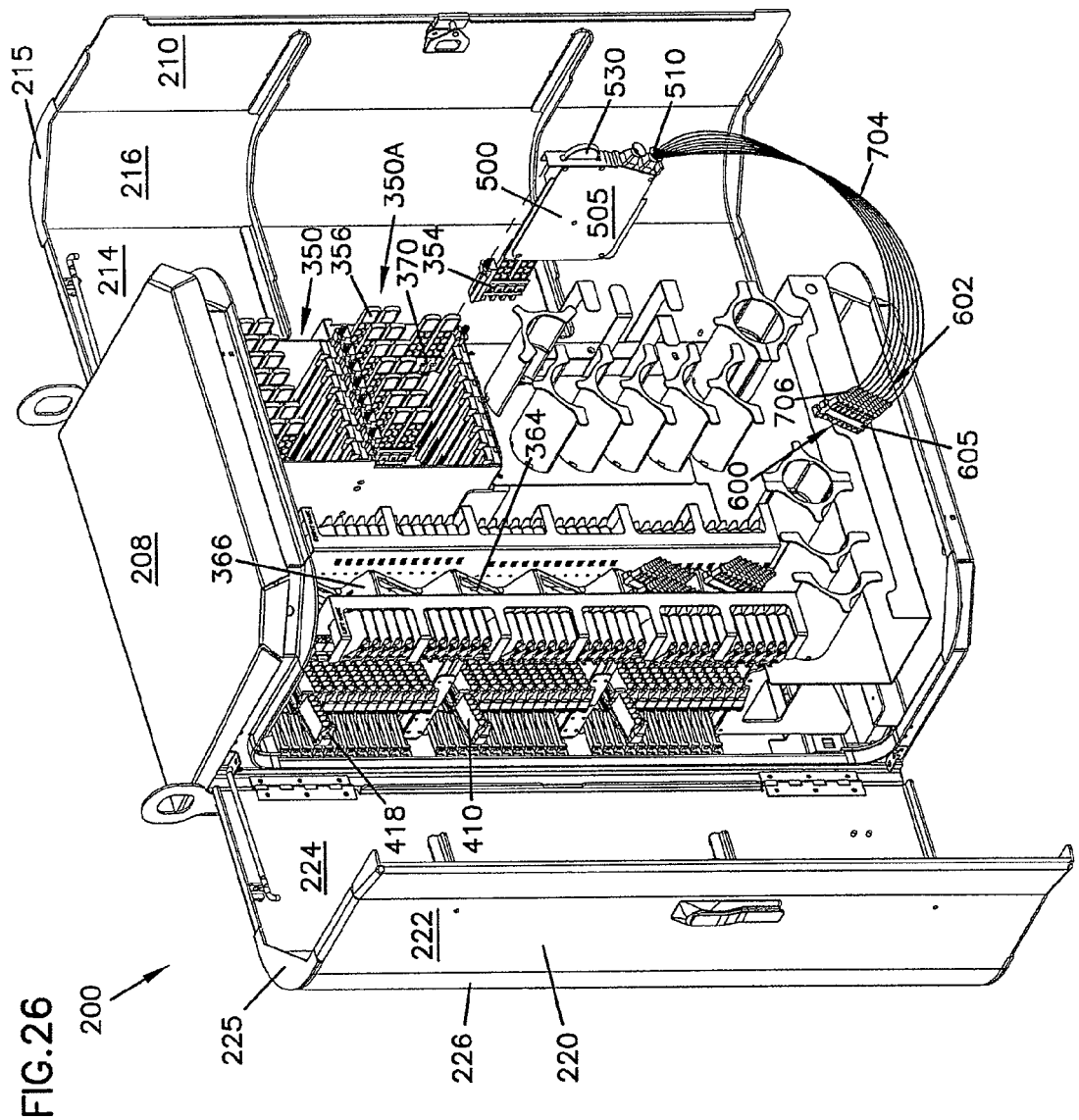
FIG. 26 is a front perspective, partially exploded view of the swing frame of FIG. 2.
Figure 28:
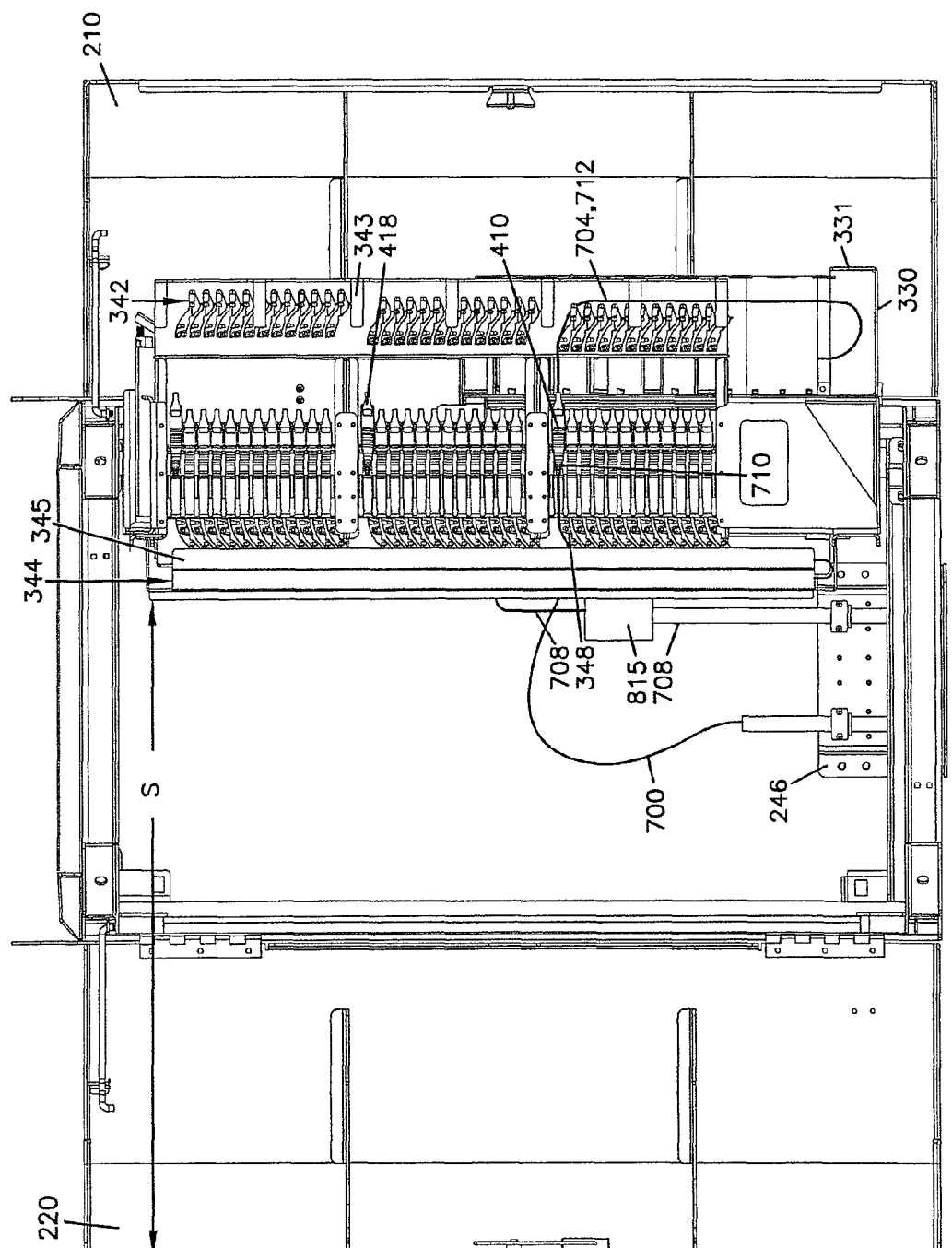
FIG. 28 shows front side view of the fiber distribution hub of FIG. 17.

Referring now to FIGS. 26-28, the feeder cable 700 can be precabled to at least one splitter module 500 and the subscriber cable 708 can be precabled to at least one termination module 400. FIG. 26 is a front perspective, partially exploded view of the FDH 200. In particular, an example of a splitter module 500 and an example of a storage module 600 are shown detached from the splitter region 350A and the storage region 360, respectively, of the swing frame 300.

Each splitter region 350, 350A is designed to house at least one splitter module 500. In some embodiments, the splitter module 500 includes a housing 505 from which at least one integral connector (not shown) protrudes rearwardly. The integral connector is configured to plug into one end of an adapter unit 354 mounted to the splitter region 350 (see FIG. 25). Typically, the splitter module 500 includes four integral connectors adapted to fit into one end of an adapter unit 354. For example, such an adapter unit 354 is shown removed from the splitter region 350 in FIG. 26. Dust caps 356 (best seen in FIG. 20) are also visible extending out from the adapter units 354.

In some embodiments, a connectorized end of a feeder cable fiber 700 is connected to the splitter module 500 by plugging the connectorized end into an opposite end of the adapter unit 354. For example, FIG. 27 shows a single fiber extending from the feeder cable 700 to the adapter unit 354 of the splitter region 350. Only a single fiber of the feeder cable 700 is shown for ease in viewing. In certain embodiments, the feeder cable 700 can include a ribbon cable that is directed to a fanout device 805 adjacent the splitter region 350. The fanout device 805 separates the ribbon cable into individual fibers that are routed to the adapter units 354.

In other embodiments, a connectorized end of a splitter input fiber 702 (see FIG. 3) is plugged into the opposite end of the adapter unit 354. The splitter input fiber 702 can have a connectorized or unconnectorized end that interfaces with the feeder cable fibers 700 at a cable interface device 905 (see FIG. 3). In still other embodiments, however, the splitter input fiber 702 connects to a splitter module 500 by passing through the housing 505 and entering the splitter module 500. In such embodiments, the splitter region 350 does not include adapter units 354.

Typically, the fibers of the feeder cable 700 or the input pigtails 702 are routed to the splitter modules 500 when the feeder cable 700 is initially installed in the cabinet or when each splitter module is incrementally installed. Precabling the splitter modules 500 facilitates the process of adding a subscriber to the network and reduces handling of the fibers 700, 702.

Each splitter module 500 includes at least one protective boot 510 protruding forwardly from the housing 505 (FIG. 26). Connectorized splitter pigtails 704 extend from the protective boot 510. Typically, each splitter module 500 receives between one and four input fibers (e.g., feeder cable fibers) and outputs between two and sixteen output fibers (e.g., pigtail fibers) for every input fiber. In one example embodiment, four input fibers enter a splitter module 500 and thirty-two output fibers exit the splitter module 500. A tab 530 extends outwardly from a front end of the splitter housing 505 for ease in mounting and removing the splitter module 500 from the splitter regions 350, 350A.

Further information regarding the splitter module 500 can be found in the U.S. application Ser. No. 11/384,297, entitled "Fiber Optic Splitter Module," filed Feb. 13, 2006, and which is hereby incorporated by reference. Additional information on other types of splitter modules can be found at U.S. application Ser. No. 10/980,978, filed Nov. 3, 2004, entitled "Fiber Optic Module And System Including Rear Connectors;" U.S. application Ser. No. 11/138,063, filed May 25, 2005, entitled "Fiber Optic Splitter Module;" U.S. application Ser. No. 11/215,837, filed Aug. 29, 2005, entitled "Fiber Optic Splitter Module With Connector Access;" and U.S. application Ser. No. 11/321,696, filed Dec. 28, 2005, entitled "Splitter Modules For Fiber Distribution Hubs," the disclosures of which are hereby incorporated by reference.

Generally, a splitter module 500 is incrementally added to the swing frame 300 precabled to a storage module 600 as shown in FIG. 26. The connectorized ends 706 of the pigtails 704 exiting the protective boot 510 are stored in one or more storage modules 600 prior to installation of the splitter 500 on the swing frame 300. In some embodiments, the connector 706 of each pigtail 704 is secured in a storage module 600 before the splitter module 500 leaves the factory. The storage module 600 protects the connectors 706 on the ends of the pigtails 704 until the pigtails 704 are needed to connect a subscriber 115 to the network 100 (see FIG. 1). Typically, the connectorized pigtails 704 of each splitter module 500 are routed to four storage modules 600 each holding eight connectors 706.

The storage module 600 includes a body 605 defining at least one cavity sized to hold at least one fiber optic connector, such as connectors 706. Typically, the body 605 is configured to retain about eight connectors. In some embodiments, the body 605 is arranged to retain the fiber connectors in a single row configuration. In other embodiments, the body 605 can be arranged to retain the connectors in a square pattern or in any other desired configuration. More information regarding the storage modules 600 can be found in U.S. application Ser. No. 10/610,325, filed on Jun. 30, 2003, entitled "Fiber Optic Connector Holder and Method;" U.S. application Ser. No. 10/613,764, filed on Jul. 2, 2003, entitled "Telecommunications Connection Cabinet;" and U.S. application Ser. No. 10/871,555, filed on Jun. 18, 2004, entitled "Multi-position Fiber Optic Connector Holder and Method," the disclosures of which are hereby incorporated by reference.

In some embodiments, the body 605 of the storage module 600 is designed to snap into one of the openings 364 defined in the storage region 360 of the swing frame 300. The openings 364 can be arranged in any desired configuration within the storage region 360. In the example shown in FIG. 26, the storage region 360 defines two columns of six openings 364. In one embodiment, the openings 364 are defined by angled shelves 366 so that the attached connectors 706 are aimed downwardly to prevent excessive fiber bending.

At least one termination module 400 (FIG. 19) can be mounted to each termination region 340 of the swing frame 300. As best seen in FIGS. 27 and 28, each termination module 400 includes a body 402 having multiple slots 404 in which adapter modules 410 can be slidably mounted. Each adapter module 410 defines at least one open cavity 415 one side of each of the open cavities is adapted to receive the fiber optic connector 706, 714 of a splitter pigtail 704 or pass-through pigtail 712, respectively. The opposite side of each open cavity 415 is adapted to receive a fiber optic connector 710 of a subscriber cable fiber 708. Typically, an adapter module 410 includes at least twelve open cavities 415.

As shown in FIG. 27, the subscriber cable 708 can be precabled to the termination modules 400. In some embodiments, the subscriber cable 708 enters the cabinet 201 and is directed to a fanout device 815 that separates and upjackets the subscriber cable 708 into multiple ribbon cables 718. The ribbon cables 718 are directed to an array of fanout devices 810. In certain embodiments, bend tubes 720 further protect the ribbon cables 718 between the fanout 815 and the fanout 810. Each fanout device 810 separates one of the ribbon cables 718 into individual fibers. Each of the fibers of the ribbon cable 718 are next routed from the fanout device 810, up the second channel 344 (FIG. 28) of the termination region 340, over an appropriate bend limiter 348, to an open cavity 415 of an adapter module 410. The connector 710 on the end of the fiber is plugged into the open cavity 415 of the adapter module 410, as shown in FIG. 28.

To enable easier access to an individual fiber 700, 708, each adapter module 410 is configured to slide is a lateral direction from a first position within the termination region 340 to an extended position jutting outwardly from the termination region 340. For example, the first adapter module 410 in each termination module 400 shown in FIGS. 26 and 27 is slid out in the second position. The sliding feature enables a user to access a particular set of fibers 700, 708 without interfering with the remaining fibers in the termination region 340. In addition, the sliding feature combined with the wrap-around doors 210, 212 of the cabinet 201 facilitate manipulation of the adapter modules 410, even when the swing frame 300 is wholly contained within the cabinet 201.

In some embodiments, each adapter module 410 also includes a locking tab 418 that enables and prevents the adapter module 410 from sliding outwardly and inwardly within the termination module 400. The locking tab 418 is configured to lock the adapter module 410 into a fixed position. To slide the adapter module 410 into a different position, the tab 418 is flipped, rotated, or otherwise adjusted to release the adapter module 410. Additional information regarding the termination modules 400 can be found in U.S. application Ser. No. 11/095,033, filed Mar. 31, 2005, and entitled "Adapter Block Including Connector Storage;" and U.S. Pat. Nos. 5,497,444; 5,717,810; 5,758,003; and 6,591,051, the disclosures of which are hereby incorporated by reference.

Referring now to FIGS. 29-30, routing schemes for connecting the splitter modules 500 in the splitter region 350 to the termination modules 400 in the termination region 340 or to the storage modules 600 in the storage region 360 are shown. FIGS. 29 and 30 show the front 302 of a swing frame 300 detached from the cabinet 201 of the FDH 200. For ease in viewing, a single splitter 500 is shown in the second splitter region 350A of the swing frame 300 outputting a single pigtail 704. Typically, the splitter pigtails 704 are upjacketed and include strength members (e.g., Kevlar) to provide increased protection from handling when the pigtails 704 are added and removed from service.

In general, the pigtails 704 are routed over the bend limiter 312 to the first channel 320 of the cable management panel 310. In some embodiments, additional pigtails 704 can be routed down the second channel 326 to avoid entangling the pigtails 704. At the bottom of the first channel 320 adjacent the trough 330, the pigtail 704 is partially wrapped around the first storage spool 332 and routed upwardly along the array of radius bend limiters 336. The pigtail is next draped over an appropriate bend limiter in the array 336 to store any excess fiber length and routed back down towards the trough 330. The pigtail is routed across the trough 330, wound over a bend limiter 335, and up to the storage region 360. The connector 706 on the end of the pigtail 704 is plugged into a storage module 600 in the storage region 360.

When the pigtail 704 is needed to connect a subscriber 115 to the network 100 (see FIG. 1), the connector 706 is removed from the storage module 600. The appropriate adapter module 410 of one of the termination modules 400 is slid outward. Typically, the subscriber cable fibers 708 have been precabled to the termination module 400 so that the connector 710 of the appropriate subscribe cable 708 is already plugged into the cavity 415 on the adapter module 410. The connector 706 of the splitter pigtail 704 is plugged into the opposite side of the same cavity 415 on the adapter module 410. The adapter module 410 is then slid back into the termination region 340.

In some embodiments, the pigtail 704 will need to be rerouted across the front of the swing frame 300 during the connection process. For example, as shown in FIG. 30, the pigtail 704 may need to be wound around a different bend limiter 337 adjacent the trough 330. In other embodiments (not shown), the pigtail 704 may need to be wound around a different bend limiter in the array of bend limiters 336 to gain or take up additional fiber length.

As discussed herein, in other embodiments, the feeder cable 700 is not split. Rather, the feeder cable 700 is connected to a pass-through fiber 712 at a cable interface device 910 (FIG. 3), such as the adapter module 374 shown in FIG. 18. The pass-through fiber 712 can be routed around the front side of the swing frame 300 to the termination region 340 or to the storage region 360 similar to the splitter pigtail 704. Typically, the pass-through fiber 712 is upjacketed similar to the splitter pigtails 704.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A fiber distribution hub adapted to provide an interface between an incoming fiber and a plurality of outgoing fibers, the fiber distribution hub comprising:
   a cabinet main body having a front and rear, the cabinet main body including a back panel at the rear of the cabinet main body extending between a top wall and a bottom wall, the back panel and top and bottom walls defining an interior of the cabinet main body;
   a first door pivotably mounted to the back panel by a first hinge arrangement at a first side of the cabinet main body closer to the rear than the front of the main cabinet body for accessing the interior of the cabinet main body, the first door configured to pivot from a closed position to an open position, the first door including a front portion and a side portion wherein the front portion is substantially parallel with the back panel and the side portion is substantially perpendicular to the back panel when the first door is pivoted into the closed position, and wherein the front portion is substantially perpendicular with the back panel and the side portion is substantially parallel with the back panel when the first door is pivoted into the open position;

a frame pivotably mounted within the cabinet, the frame configured to pivot about a pivot axis through the front of the cabinet main body from a first position to a second position when the door is pivoted into the open position, the frame including a termination region with a plurality of adapters and a splitter region with at least one splitter, wherein the termination region of the frame is contained within the interior of the cabinet when the frame is pivoted into the first position, and the termination region is external of the cabinet when the frame is pivoted into the second position, wherein the pivot axis extends between the top wall and the bottom wall and is situated between the first hinge arrangement and the front of the cabinet main body adjacent the first hinge arrangement such that the pivot axis is closer to the rear than the front of the main cabinet body.

2. The fiber distribution hub of claim 1, further comprising a second door pivotably mounted to the back panel by a second hinge arrangement at a second side of the cabinet main body adjacent the rear for accessing the interior of the cabinet main body, the second door configured to pivot from a closed position to an open position, the second door including a front portion and a side portion wherein the front portion is substantially parallel with the back panel and the side portion is substantially perpendicular to the back panel when the second door is pivoted into the closed position, and wherein the front portion is substantially perpendicular with the back panel and the side portion is substantially parallel with the back panel when second first door is pivoted into the open position.

3. The fiber distribution hub of claim 2, wherein the pivot axis is situated at the first side of the cabinet main body.

4. The fiber distribution hub of claim 2, wherein:
the cabinet main body defines an access opening having a front portion defined at the front of the cabinet main body and first and second side portions defined at the first and second sides of the cabinet main body, respectively, the first and second side portions of the access opening and the front portion of the access opening being defined between the top and bottom walls;
the first and second doors each include a first portion and a second portion that is angled relative to the first portion, the first and second doors being configured to wrap around the cabinet main body when in the closed position such that the first portion of the door extends between the top and bottom walls of the cabinet main body and covers the side portion of the access opening and the second portion of the door extends between the top and bottom walls of the cabinet main body and covers at least a part of the front portion of the access opening.

5. The fiber distribution hub of claim 4, wherein the top wall includes an overhang portion that overhangs the first and second portions of the door when the door is in the closed position.

6. The fiber distribution hub of claim 4, wherein the forward edge of the top wall defines a forward-most portion of the cabinet main body.

7. The fiber distribution hub of claim 2, further comprising first side strips that extend between the top and bottom walls and that extend forwardly from the back panel, the first hinge arrangement being mounted to the first side strip and the second hinge arrangement being mounted to the second side strip.

8. The fiber distribution hub of claim 1, wherein:
the optical splitter module is configured to split optical signals input to the fiber distribution hub by the incoming fiber; and wherein the fiber distribution hub further comprises:
a plurality of splitter pigtails extends from the optical splitter module, each of the splitter pigtails being configured to carry one of the split signals, and each of the splitter pigtails having a connectorized end; and
each of the adapters is configured to receive one of the connectorized ends of the splitter pigtails.

9. The fiber distribution hub of claim 8, wherein the frame includes a cable management panel having a column of bend radius limiters thereon defining a vertical routing channel located within the cabinet main body, wherein a slack length of each splitter pigtail is wrapped around at least one of the bend radius limiters when the splitter pigtail is plugged into the termination field, wherein the splitter pigtails are routed downwardly from the splitter region through the vertical routing channel and then upwardly to the termination field.

10. The fiber distribution hub of claim 8, wherein the termination region includes a plurality of rows of the adapters that extend at an angle to the back panel.

11. The fiber distribution hub of claim 1, wherein the front portion of the first door is unitary with the side portion of the first door.

12. The fiber distribution hub of claim 1, wherein the top wall is a cantilevered top wall that extends from the back panel to the front of the cabinet main body, and wherein the top cantilevered wall is unsupported other than the cantilever.

* * * * *